United States Patent
Batchelder et al.

(10) Patent No.: US 10,086,564 B2
(45) Date of Patent: Oct. 2, 2018

(54) ADDITIVE MANUFACTURING PROCESS WITH DYNAMIC HEAT FLOW CONTROL

(71) Applicant: Stratasys, Inc., Eden Prairie, MN (US)

(72) Inventors: J. Samuel Batchelder, Somers, NY (US); William J. Swanson, St. Paul, MN (US); Kevin C. Johnson, Minneapolis, MN (US)

(73) Assignee: Stratsys, Inc., Eden Prairie, MN (US)

( * ) Notice: Subject to any disclaimer, the term of this patent is extended or adjusted under 35 U.S.C. 154(b) by 1126 days.

(21) Appl. No.: 14/046,315

(22) Filed: Oct. 4, 2013

(65) Prior Publication Data

US 2015/0097307 A1 Apr. 9, 2015

(51) Int. Cl.
| | |
|---|---|
| B29C 44/02 | (2006.01) |
| B29C 67/00 | (2017.01) |
| B29B 13/02 | (2006.01) |
| B33Y 10/00 | (2015.01) |
| B29C 35/02 | (2006.01) |

(52) U.S. Cl.
CPC ........ B29C 67/0055 (2013.01); B29B 13/022 (2013.01); *B29C 2035/0211* (2013.01); *B33Y 10/00* (2014.12)

(58) Field of Classification Search
CPC ..... B29C 67/00; B29C 67/0055; B33Y 10/00; B33Y 30/00; B33Y 50/00; B33Y 50/02
See application file for complete search history.

(56) References Cited

U.S. PATENT DOCUMENTS

| | | |
|---|---|---|
| 3,750,475 A | 8/1973 | Weaver |
| 4,460,398 A | 7/1984 | Sasaki |
| 4,479,347 A | 10/1984 | Larsen et al. |
| 4,797,313 A | 1/1989 | Stolk et al. |
| 5,121,329 A | 6/1992 | Crump |
| 5,169,081 A | 12/1992 | Goedderz |
| 5,303,141 A | 4/1994 | Batchelder et al. |
| 5,312,224 A | 5/1994 | Batchelder et al. |
| 5,340,433 A | 8/1994 | Crump |
| 5,342,687 A | 8/1994 | Iwai et al. |
| 5,503,785 A | 4/1996 | Crump et al. |
| 5,738,817 A | 4/1998 | Danforth et al. |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |

(Continued)

OTHER PUBLICATIONS

International Search Report and Written Opinion dated Apr. 1, 2015 for corresponding International Application No. PCT/US2014/058577, filed Oct. 1, 2014.

*Primary Examiner* — Ryan M Ochylski

(74) *Attorney, Agent, or Firm* — Peter J. Ims; Westman, Champlin & Koehler, P.A.

(57) ABSTRACT

A liquefier assembly for use in an additive manufacturing system, which includes a rigid member having a gap, a liquefier tube operably disposed in the gap, one or more heater assemblies disposed in the gap in contact with the liquefier tube, and configured to heat the liquefier tube in a zone-by-zone manner, preferably one or more thermal resistors disposed in the gap between the rigid member and the heater assemblies, and preferably one or more sensors configured to operably measure pressure within the liquefier tube. The one or more heater assemblies may be operated to provide dynamic heat flow control.

17 Claims, 13 Drawing Sheets

(56) References Cited

U.S. PATENT DOCUMENTS

| | | |
|---|---|---|
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,228,923 B1 | 5/2001 | Lombardi et al. |
| 6,238,613 B1 | 5/2001 | Batchelder et al. |
| 6,257,517 B1 | 7/2001 | Babish et al. |
| 6,547,995 B1 | 4/2003 | Comb |
| 6,578,596 B1 | 6/2003 | Batchelder et al. |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,127,309 B2 | 10/2006 | Dunn et al. |
| 7,363,686 B2 | 4/2008 | Fukuyasu et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,744,364 B2 | 6/2010 | Turley et al. |
| 7,896,209 B2 | 3/2011 | Batchelder et al. |
| 7,897,074 B2 | 3/2011 | Batchelder et al. |
| 8,153,182 B2 | 4/2012 | Comb et al. |
| 8,221,669 B2 | 7/2012 | Batchedler et al. |
| 8,236,227 B2 | 8/2012 | Batchelder et al. |
| 8,403,658 B2 | 3/2013 | Swanson |
| 8,439,665 B2 | 5/2013 | Batchelder et al. |
| 9,186,846 B1 | 11/2015 | Mark et al. |
| 9,327,447 B2 | 5/2016 | Batchelder et al. |
| 2003/0128267 A1 | 7/2003 | Teung et al. |
| 2005/0129941 A1 | 6/2005 | Comb et al. |
| 2007/0003656 A1 | 1/2007 | LaBossiere et al. |
| 2007/0228590 A1 | 10/2007 | LaBossiere et al. |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0018924 A1 | 1/2010 | Fendya et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0036859 A1 | 2/2011 | Matsuzaki et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0018924 A1 | 1/2012 | Swanson et al. |
| 2012/0068378 A1 | 3/2012 | Swanson et al. |
| 2012/0070523 A1 | 3/2012 | Swanson et al. |
| 2012/0164256 A1 | 6/2012 | Swanson et al. |
| 2013/0078073 A1 | 3/2013 | Comb et al. |
| 2013/0161432 A1 | 6/2013 | Mannella et al. |
| 2013/0161442 A1 | 6/2013 | Mannella et al. |
| 2014/0159284 A1 | 6/2014 | Leavitt |
| 2015/0097053 A1 | 4/2015 | Batchelder et al. |
| 2015/0097308 A1 | 4/2015 | Batchelder et al. |

ADDITIVE MANUFACTURING PROCESS WITH DYNAMIC HEAT FLOW CONTROL

CROSS-REFERENCE TO RELATED APPLICATION(S)

Reference is hereby made to co-filed U.S. patent application Ser. No. 14/046,290, entitled "Liquefier Assembly For Additive Manufacturing Systems, And Methods Of Use Thereof"; to co-filed U.S. patent application Ser. No. 14/046,301, entitled "Liquefier Assembly With Multiple-Zone Plate Heater Assembly"; and to co-filed U.S. patent application Ser. No. 14/046,323, entitled "Additive Manufacturing System And Process With Material Flow Feedback Control".

BACKGROUND

The present disclosure relates to additive manufacturing systems for printing or otherwise producing three-dimensional (3D) parts and support structures. In particular, the present disclosure relates to print head liquefier assemblies for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a method for printing a 3D part with an additive manufacturing system. The method includes feeding a consumable material to a liquefier tube retained by the additive manufacturing system at multiple feed rates, and heating the liquefier tube over multiple heating zones to melt the consumable material received in the liquefier tube. The method also includes dynamically adjusting the heating of the liquefier tube over the multiple heating zones based at least in part of the feed rates of the consumable material to the liquefier tube, and extruding the molten consumable material from a nozzle retained by the liquefier tube.

Another aspect of the present disclosure is directed to a method for printing a 3D part with an additive manufacturing system, where the method includes feeding a consumable material to a liquefier tube retained by the additive manufacturing system at a first feed rate, and heating the liquefier tube along multiple heating zones to provide a substantially uniform temperature profile along the liquefier tube while feeding the consumable material at the first feed rate. The method also includes adjusting the feeding of the consumable material to the liquefier tube from the first feed rate to a second feed rate that is faster than the first feed rate, and adjusting the heating of the liquefier tube for the multiple heating zones to provide a second temperature profile along the liquefier tube while feeding the consumable material at the second feed rate, where the second temperature profile includes at least one temperature difference between the multiple heating zones. The method further includes extruding the consumable material from a nozzle retained by the liquefier tube.

Another aspect of the present disclosure is directed to a method for printing a 3D part with an additive manufacturing system, where the method includes feeding a filament to a liquefier tube retained by the additive manufacturing system, and controllably supplying electrical power over multiple conductor traces to heating elements to heat up the heating elements in an independent manner. The method also includes heating the liquefier tube over multiple zones with the independently-heated heating elements to melt the filament received in the liquefier tube, and adjusting the electrical power relayed to at least a portion of the multiple conductor traces to adjust the heating of the heating elements in association with changes in rates at which the filament is fed to the liquefier tube. The method further includes extruding the molten material of the filament from a nozzle retained by the liquefier tube.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "operably measure" and like refers to a measurement that may be a direct measurement and/or an indirect measurement. For example, operably measuring pressure within a liquefier tube may be performed by directly measuring the pressure within the liquefier tube, and/or may be performed by indirectly measuring the pressure within the liquefier tube by directly measuring another effect that is based on the pressure within the liquefier tube (e.g., an expansion of the liquefier tube, and the like).

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTIO

Figure 1:
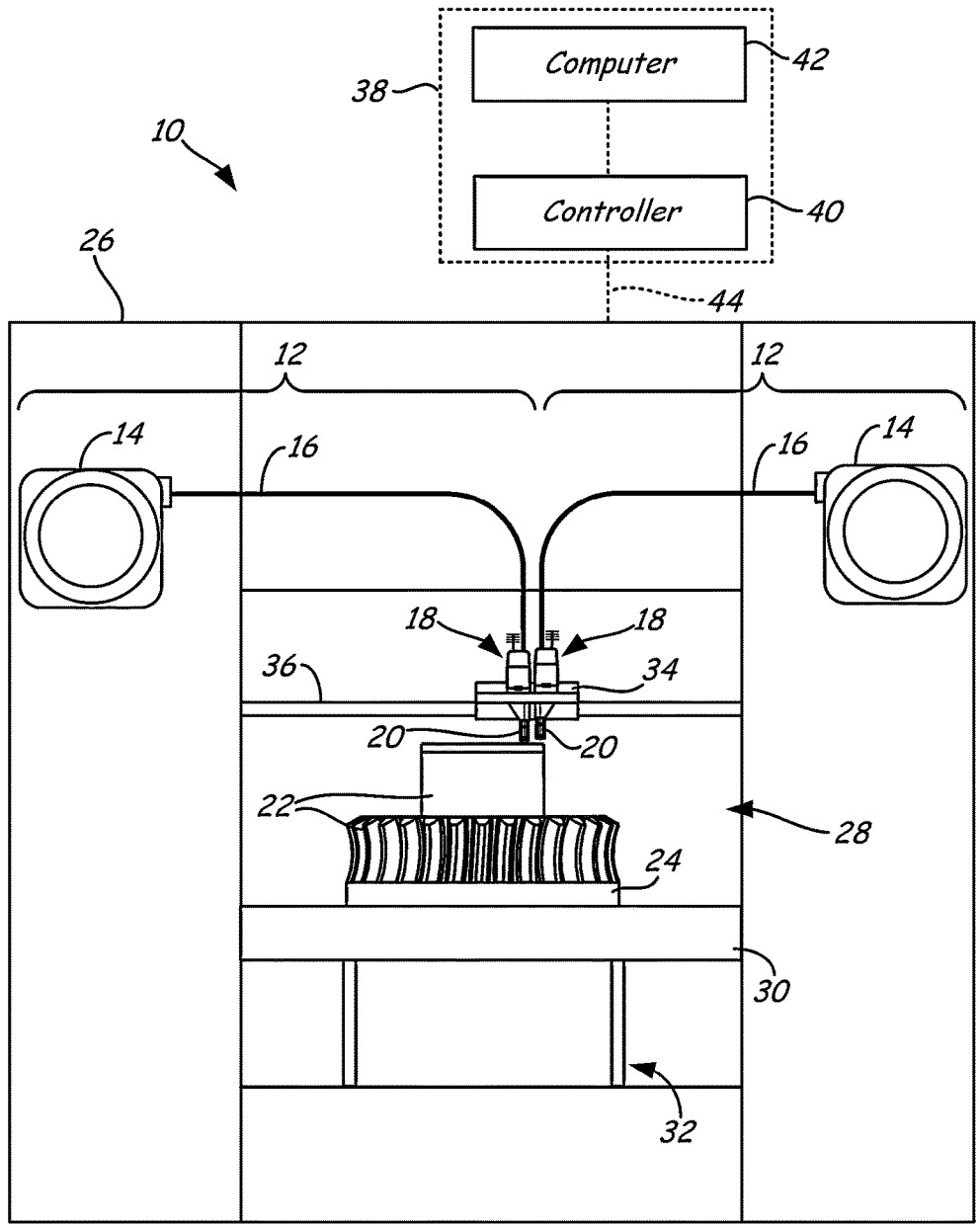
FIG. 1 is a front view of an additive manufacturing system configured to print 3D parts and support structures with the use of one or more print head liquefier assemblies of the present disclosure.

The present disclosure is directed to a print head liquefier assembly for use in an extrusion-based additive manufacturing system to print 3D parts and support structures in a layer-by-layer manner using an additive manufacturing technique. As discussed below, the liquefier assembly is uniquely engineered to improve thermal control over the melting and extrusion of consumable materials. In a first embodiment, the liquefier assembly operates with a multiple-zone heating mechanism and optionally one or more heat sink components that together create a push-pull thermal driver for the liquefier assembly. With this design, the liquefier assembly can generate controllable and precise heat flows, thereby providing fast response times and high flow rates during printing operations.

In a second embodiment, the liquefier assembly includes one or more plate heater assemblies configured to transfer thermal energy to a liquefier tube in a zone-by-zone manner. In this embodiment, each plate heater assembly preferably includes multiple conductor traces that terminate in heating elements, where each heating element defines a heating zone for the liquefier tube. During operation, electrical power may be relayed from the additive manufacturing system to the heating elements via conductor traces of the plate heater assembly in a controlled and independent manner. In some preferred aspects, the liquefier assembly includes a pair of plate heater assemblies disposed on opposing sides of the liquefier tube, where plate heater assemblies may have the same number of conductor traces and heating elements to maintain symmetric heating zones along the length of the liquefier tube.

In a third embodiment, the present disclosure is directed to a method for dynamically controlling the heat flow transferred to and from the liquefier tube over multiple heating zones. In particular, this technique allows dynamic adjustments to be made to the temperature profile along the length of the liquefier tube to accommodate changes in material flow rates, as well as other non-steady state conditions that occur during a printing operation (e.g., starting, stopping, accelerating, and decelerating). In particular, the dynamic control method may vary the temperature difference between upstream and downstream heating zones relative to the material flow rate, such as by initially overshooting a target surface temperature of the material, followed by an undershooting of this temperature. This allows high material flow rates to be achieved, while also reducing the risk of thermally degrading the consumable material.

In a fourth embodiment, the present disclosure is directed to a closed-loop method for monitoring and controlling material flow within the liquefier tube. As discussed below, it has been found that long standard liquefiers (e.g., 1.5-inches long) can accelerate the flow of a part or support material very quickly (e.g., in about 10 milliseconds or less). However, these liquefiers also exhibit complex flow decelerations that include fast decay portions (e.g., less than about 20 milliseconds) and slow decay portions (e.g., greater than about 100 milliseconds). These slow decay portions are an unexpected issue, which is compounded by the fact that, in some situations, they are not repeatable over successive decelerations. This unpredictability in the flow deceleration reduces the response time control over the material flow, such as when slowing down into road corners and stopping at the end of roads.

To compensate for the unpredictability in flow decelerations, the liquefier assembly may be configured to operably measure the pressure within the liquefier tube. This allows the liquefier assembly to be operated in a closed-loop manner with one or more process control loops to provide flow control feedback, at least for the relatively slow time response components. Compensating for the unpredictability in flow decelerations can also improve response times during printing operations, such as during cornering and stopping events.

The liquefier assembly of the present disclosure may be used with any suitable extrusion-based additive manufacturing system. For example, FIG. 1 shows system 10 in use with two consumable assemblies 12, where each consumable assembly 12 is an easily loadable, removable, and replaceable container device that retains a supply of a consumable filament for printing with system 10. Typically, one of the consumable assemblies 12 contains a part material filament, and the other consumable assembly 12 contains a support material filament. However, both consumable assemblies 12 may be identical in structure.

In the shown embodiment, each consumable assembly 12 includes container portion 14, guide tube 16, and print heads 18, where each print head 18 preferably includes a liquefier assembly 20 of the present disclosure. Container portion 14 may retain a spool or coil of a consumable filament, such as discussed in Mannella et al., U.S. Publication Nos. 2013/0161432 and 2013/0161442; and in Batchelder et al., U.S. patent application Ser. No. 13/708,145. Guide tube 16 interconnects container portion 14 and print head 18, where a drive mechanism of print head 18 (or of system 10) draws successive segments of the consumable filament from container portion 14, through guide tube 16, to liquefier assembly 20 of the print head 18.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12. In these alternative embodiments, print head 18 (having liquefier assembly 20) may optionally be retrofitted into existing additive manufacturing systems.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING".

As shown, system 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive container portions 14 of consumable assemblies 12. In alternative embodiments, the container bays may be omitted to reduce the overall footprint of system 10. In these embodiments, container portions 14 may stand adjacent to system casing 26, while providing sufficient ranges of movement for guide tubes 16 and print heads 18.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive one or more removable print heads, such as print heads 18, and is supported by head gantry 36. Examples of suitable devices for head carriage 34, and techniques for retaining print heads 18 in head carriage 34, include those disclosed in Swanson et al., U.S. Pat. No. 8,403,658; and Swanson et al., U.S. Publication No. 2012/0164256. In some preferred embodiments, each print head 18 is configured to engage with head carriage 34 to securely retain the print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a linear or pivoting manner).

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18, head carriage 34, and head gantry 36 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. Nos. 7,896,209 and 7,897,074; and Comb et al., U.S. Pat. No. 8,153,182.

In the shown embodiment, head gantry 36 is a belt-driven gantry assembly configured to move head carriage 34 (and the retained print heads 18) in (or substantially in) a horizontal x-y plane above chamber 28. Examples of suitable gantry assemblies for head gantry 36 include those disclosed in Comb et al., U.S. Publication No. 2013/0078073, where head gantry 36 may also support deformable baffles (not shown) that define a ceiling for chamber 28.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of system 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10. While illustrated as a single signal line, communication line 40 may include one or more electrical, optical, and/or wireless signal lines, which may be external and/or internal to system 10, allowing controller assembly 38 to communicate with various components of system 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from container portions 14 and through guide tubes 16, respectively.

Figure 2:
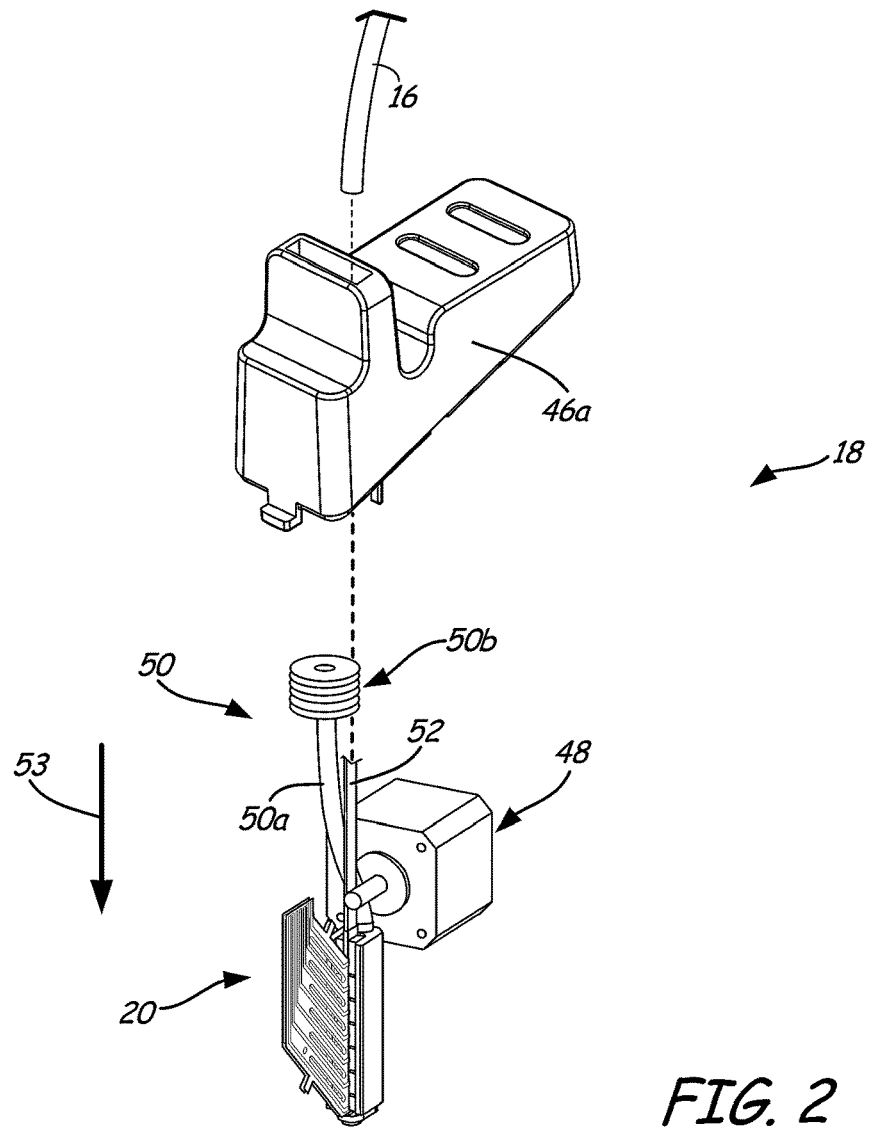
FIG. 2 is an exploded view of a print head retaining a liquefier assembly of the present disclosure.
Figure 2:
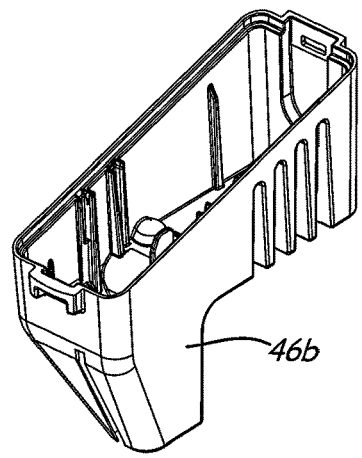

FIG. 2 is an exploded view of an example print head 18, which includes housing 46 (having housing components 46a and 46b), drive mechanism 48, liquefier assembly 20 of the present disclosure, and heat sink unit 50, which are shown in use with filament 52. Examples of suitable components for housing 46 and drive mechanism 48 include those discussed in Batchelder et al., U.S. Pat. Nos. 7,896,209 and 7,897,074; Swanson et al., U.S. Publication No. 2012/0164256, Koop et al., U.S. patent application Ser. No. 13/708,116; and Leavitt, U.S. patent application Ser. No. 13/708,037.

Liquefier assembly 20 is discussed herein as being configured with a ribbon filament and ribbon liquefier architecture. The term "ribbon filament" as used herein refers to a filament having a substantially rectangular, arcuate, and/or an elliptical cross-section along its longitudinal length, which may optionally include one or more surface tracks for engaging with drive mechanism 48, such as disclosed in Batchelder et al., U.S. Pat. No. 8,236,227. Correspondingly, the term "ribbon liquefier" as used herein refers to a liquefier (e.g., liquefier tube) having a substantially rectangular, arcuate, and/or an elliptical inner-channel cross-section along its longitudinal length.

For each of the ribbon filament and the ribbon liquefier, the cross-section has a width and a thickness, where a maximum extent of the width is at least about 2.5 times greater than a maximum extent of the thickness. For a ribbon filament or ribbon liquefier having a substantially rectangular or arcuate cross-section, the cross-section may have sharp corners (i.e., 90-degree corners) and/or rounded corners. In aspects in which the ribbon filament has an elliptical cross-section, the elliptical cross-section preferably has an eccentricity of about 0.8 or greater, and more preferably of about 0.9 or greater. Examples of suitable ribbon filaments and ribbon liquefier architectures for filament 52 and liquefier assembly 20 include those discussed in Batchelder et al., U.S. Pat. Nos. 8,221,669; 8,236,227; and 8,439,665, the contents of which are incorporated by reference in their entireties to the extent that they do not conflict with the present disclosure.

As will be apparent from the discussion herein, the ribbon filament and ribbon liquefier architecture provides several advantages for liquefier assembly 20, such as a convenient mechanism for operably measuring liquefier pressures, as well as improved heat flow control, fast response times, and fast material flow rates. However, in alternative embodiments, as discussed below, liquefier assembly 20 may be configured for use with liquefiers and filaments having other cross-sectional geometries, preferably cylindrical filaments and liquefiers.

Heat sink unit 50 includes heat pipe 50a and heat sink 50b, and is a component of liquefier assembly 20 that removes heat that is generated during operation, as discussed below. In the shown example, heat sink 50b is a pagoda-fin-style heat sink configured to dissipate heat from heat pipe 50a, and may be located internally or externally to housing 46 of print head 18. For instance, the pagoda-fin-style heat sink 50b may include a plurality of fins (e.g., 5-15 fins) that each have a suitable surface area (e.g., 1-5 inches in diameter). Heat sink 50b may also operate in conjunction with an active cooling unit, such as a forced supply of air blown toward (or drawn away from) heat sink 50b. In alternative embodiments, heat sink 50b may exhibit a variety of different fin geometries and arrangements.

As further shown, drive mechanism 48 is located upstream from liquefier assembly 20, and is configured to feed successive segments of a filament 52 from guide tube 16 to liquefier assembly 20 under motorized power. Drive mechanism 48 also preferably includes a skid plate or other suitable bearing surface (e.g., a rotating bearing surface, not shown) configured to support the opposing side of filament 52 while drive mechanism 48 is engaged with filament 52. As used herein, the terms "upstream" and "downstream" are made with reference to a filament feed direction, as illustrated by arrow 53.

Liquefier assembly 20 thermally melts the received successive segments of filament 52, where the molten portion of the filament material forms a meniscus around the unmelted portion of filament 52. During an extrusion of the molten material from liquefier assembly 20, the downward movement of filament 52 functions as a viscosity pump to extrude the molten material as an extrudate for printing 3D part 22 or support structure 24. As such, the extrudate flow rate is based in large part on the pressure within liquefier assembly 20, where the pressure is due to the viscosity pump action and the thermal expansion of the filament material upon melting. Accordingly, the highest pressure levels within liquefier assembly 20 tend to reside around the meniscus.

Changes in the material flow rate of the extrudate, such as when starting, stopping, accelerating, and decelerating, or when faster or slower printing rates are desired, are controlled by changing the feed rate of filament 52 with drive mechanism 48, based on drive commands from controller assembly 38. However, the flow rate of the extrudate out of liquefier assembly 20 does not always immediately respond the same to changes in the feed rate of filament 52, and exhibits a response time delay after the change in feed rate. For example, the extrudate may flow at different rates from liquefier assembly 20 for the same instantaneous feed rate of filament 52 into liquefier assembly 20. This is due to numerous non-steady state conditions within liquefier assembly 20, such as changes in the melt flow characteristics of the filament material, previous changes in filament feed rates and extrudate flow rates (e.g., during previous starting, stopping, accelerating, and/or decelerating), response time delays, and the like.

In an open loop design, without any feedback measurements of the extrudate, controller assembly 38 typically operates print head 18 based on predictive models on how the extrudate will flow. However, due to the virtually unlimited 3D part geometries that can be printed with system 10, it is difficult to predict how print head 18 will function in every situation. Furthermore, open loop designs will not detect gradual changes in print head 18 over time, such as liquefier scaling, material accumulation, and the like. Partial tip clogs can alter the performance of a liquefier without rendering it non-functional.

Instead, as discussed below, liquefier assembly 20 may operate in a closed-loop manner based on pressure measurements from within liquefier assembly 20. This allows controller assembly 38 to compensate for pressure variations within liquefier assembly 20, thereby more accurately controlling the extrudate flow rate out of liquefier assembly 20. Additionally, liquefier assembly 20 may operate with temperature measurements along multiple heating zones, which may also be used to prevent temperature fluctuations within liquefier assembly 20, and to dynamically control temperature profiles along liquefier assembly 20. These feedback controls can assist in reducing response time delays, and improving part quality and material flow rates.

Upon exiting liquefier assembly 20, the resulting extrudate may be deposited onto platen 30 as a series of roads for printing 3D part 22 or support structure 24 in a layer-by-layer manner. After the print operation is complete, the resulting 3D part 22 and support structure 24 may be removed from chamber 28, and support structure 24 may be removed from 3D part 22. 3D part 22 may then undergo one or more additional post-processing steps.

Figure 3:
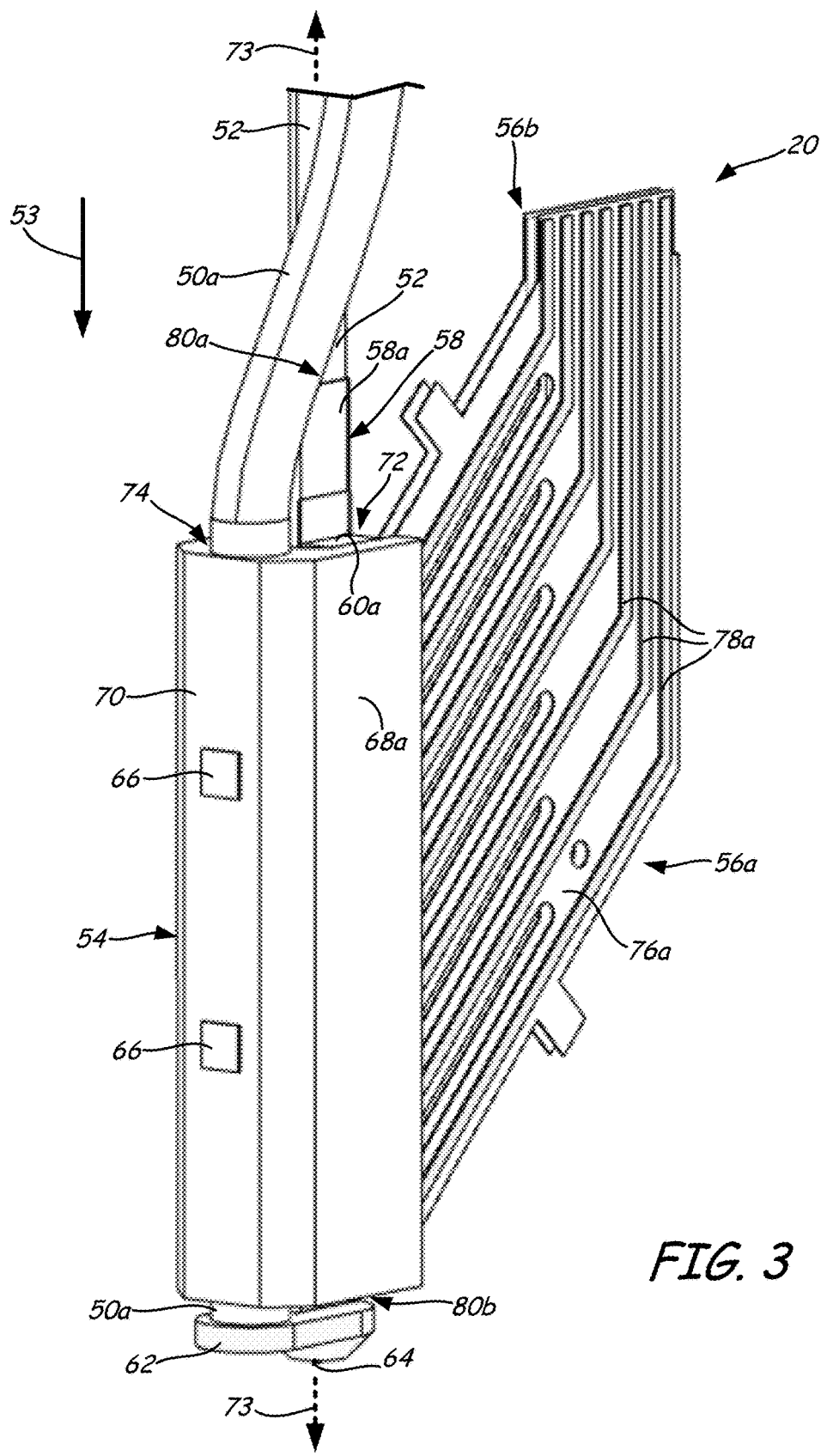
FIG. 3 is a rear, right perspective view of the liquefier assembly.
Figure 4:
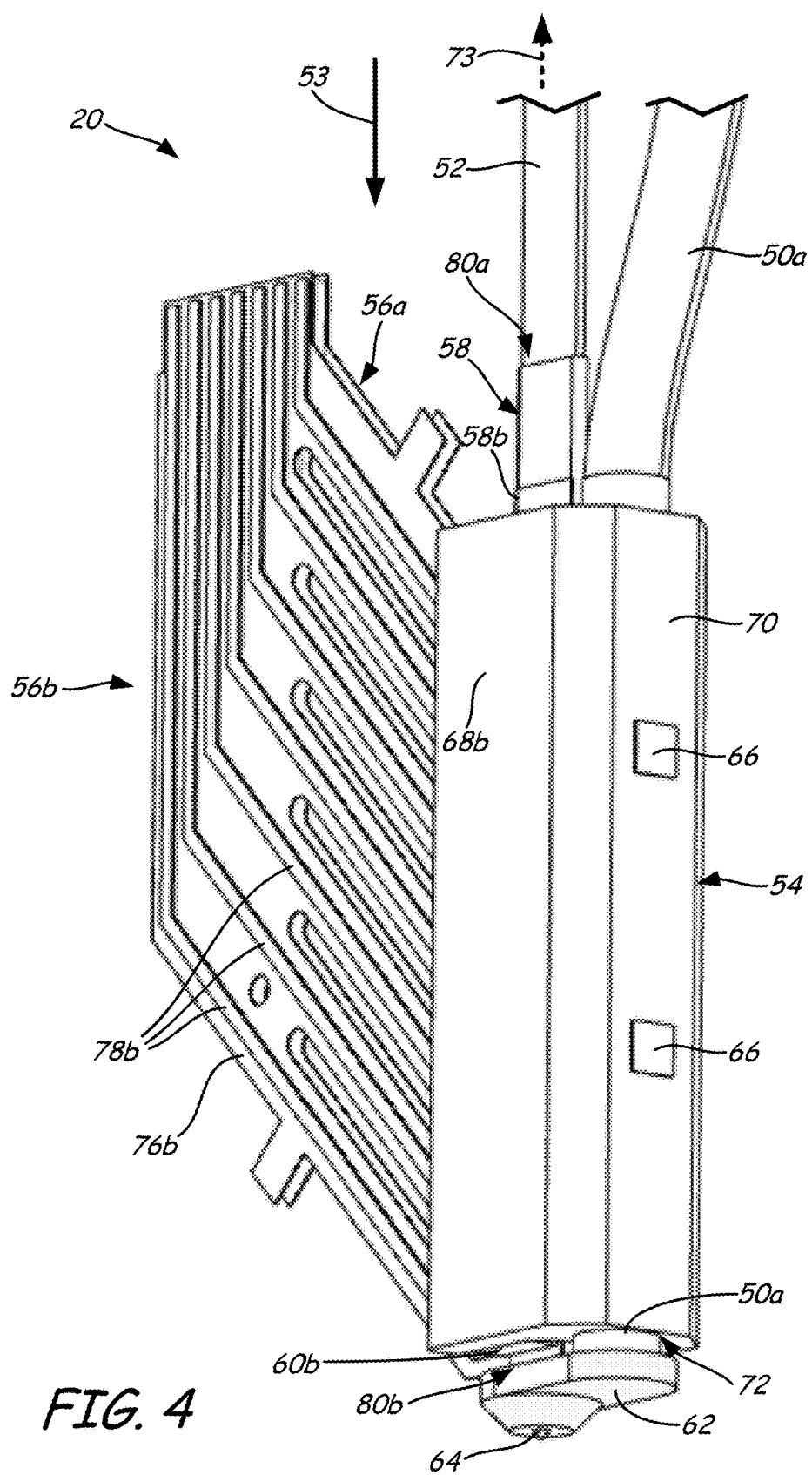
FIG. 4 is a rear, left perspective view of the liquefier assembly.

FIGS. 3-6 further illustrate liquefier assembly 20 in use with filament 52, where drive mechanism 48 and heat sink 50a are omitted for ease of viewing. As shown in FIGS. 3 and 4 (shown at opposite viewpoints from FIG. 2), liquefier assembly 20 includes clam block 54, a pair of heater assemblies 56a and 56b, liquefier tube 58, a pair of opposing thermal resistors 60a and 60b (thermal resistor 60b is best shown below in FIGS. 5 and 6), tip shield 62, nozzle 64, and sensors 66.

Clam block 54 is an example rigid member that includes a pair of opposing arms 68a and 68b, which extend parallel to each other from a base portion 70. Base portion 70 and arms 68a and 68b collectively define a U-shaped gap 72 that extends along a longitudinal axis 73 of clam block 54 and liquefier tube 58. In the shown arrangement, liquefier tube 58 is disposed within gap 72, between the opposing heater assemblies 56a and 56b. Heater assemblies 56a and 56b are respectively disposed between thermal resistors 60a and 60b, where thermal resistors 60a and 60b are respectively held against heater assemblies 56a and 56b by arms 68a and 68b. Arms 68a and 68b preferably sandwich liquefier tube 58, heater assemblies 56a and 56b, and thermal resistors 60a and 60b under sufficient compression to maintain good interfacial contact between the components, and to prevent them from slipping apart, although it is preferable that liquefier tube 58 be replaceable in the assembly.

Clam block 54 may be fabricated from one or more materials that provide a strong and rigid structure, and that are preferably thermally conductive, such as one or more metals (e.g., stainless steel and aluminum). Additionally, clam block 54 is preferably capable of maintaining compression on the components retained within gap 72, while also being capable of withstanding expansion pressures generated in liquefier tube 58 (when filament 52 is melted and extruded) without breaking or cracking.

Base portion 70 of clam block 54 includes a shaft 74 (best shown below in FIGS. 5 and 6) that preferably extends through the length of base portion 70, parallel to gap 72, for receiving heat pipe 50a. Heat pipe 50a is a sealed thermally-conductive tube configured to draw the thermal energy away from clam block 54 via evaporative cooling. As discussed above, the top end of heat pipe 50a is connected to heat sink 50b (shown in FIG. 2). The lower portion of heat pipe 50a may be press fit into shaft 74 to maintain good interfacial contact with base portion 70. In some embodiments, a thermally-conductive hollow sleeve may be disposed between base portion 70 and heat pipe 50a, such as for compliance purposes. In alternative embodiments, heat pipe 50a may be integrally formed with base portion 70 such that shaft 74 functions as a portion of heat pipe 50a.

Heat pipe 50a also preferably extends along the entire length of base portion 70, and into tip shield 62. This allows heat pipe 50a to draw heat from clam block 54 along its entire length, and from tip shield 62. As discussed below, heat pipe 50a is beneficial for assisting in quickly removing heat from liquefier assembly 20 to rapidly cool down one or more heating zones of liquefier tube 58 when desired. Furthermore, heat pipe 50a may draw heat away from the inlet end of liquefier tube 58, above heater assemblies 56a and 56b, to prevent filament 52 from softening and buckling at the inlet end.

In the shown embodiment, heater assemblies 56a and 56b are a pair of mirror-image plate heaters configured to transfer thermal energy to liquefier tube 58. As shown in FIG. 3, heater assembly 56a includes a shim or plate portion 76a containing multiple conductor traces 78a separated by slots that function as thermal dams. Similarly, as shown in FIG. 4, heater assembly 56b includes a shim or plate portion 76b containing multiple conductor traces 78b separated by slots that function as thermal dams.

Shim portions 76a and 76b are multiple-layer plates that each preferably include a rigid base layer (e.g., grade 410 stainless steel) coated with one or more glass and/or other dielectric layers. Suitable plate thicknesses for shim portions 76a and 76b range from about 2 mils to about 20 mils. In some embodiments, shim portions 76a and 76b may be connected, such as at the opposing side from liquefier tube 58 in a closed book-like manner. This arrangement may assist in retaining liquefier tube 58.

Conductor traces 78a and 78b are traces of electrically-conductive materials routed along the outermost sides of shim portions 76a and 76b. As discussed below, conductor traces 78a and 78b respectively terminate in heating elements 82a (shown below in FIGS. 5 and 7) and heating elements 82b (shown below in FIG. 6) located on opposing sides of liquefier tube 58. Additionally, the top-most sections of shim portions 76a and 76b may engage with an electrical connector (not shown) of print head 18 and/or head carriage 34, which relays electrical power from system 10 to heating elements 82a and 82b via conductor traces 78a and 78b.

In the shown example, heater assemblies 56a and 56b each include seven conductor traces 78a and 78b and six heating elements 82a and 82b to produce six heating zones that extend along the length of liquefier tube 58. In alternative embodiments, heater assemblies 56a and 56b may include different numbers of conductor traces 78a and 78b and heating elements 82a and 82b, such as three or more conductor traces 78a and 78b (and two or more heating elements 82a and 82b, for two or more heating zones), more preferably from three to eleven conductor traces 78a and 78b (and two to ten heating elements 82a and 82b), and even more preferably from five to eleven conductor traces 78a and 78*b* (and four to ten heating elements 82*a* and 82*b*). As can be appreciated, heater assemblies 56*a* and 56*b* preferably have the same number of conductor traces and heating elements (e.g., seven conductor traces and six heating elements each) to maintain symmetric heating zones along the length of liquefier tube 58.

In the shown example, liquefier tube 58 is a ribbon liquefier tube with a substantially rectangular cross section for receiving filament 52. As briefly mentioned above, in alternative embodiments, liquefier tube 58 may have any suitable geometry, preferably a cylindrical tube geometry. Liquefier tube 58 is preferably fabricated from one or more rigid, thermally-conductive materials, such as stainless steel, and may be fabricated in a variety of different manners. In a first example, the cross-sectional dimensions of liquefier tube 58 may be attained by flattening or otherwise collapsing or crushing a cylindrical liquefier around a shim insert.

Alternatively, liquefier tube 58 may be produced by stamping a pair of metal sheets into half-sections, which may then be welded or otherwise sealed together to attain the desired cross-sectional dimensions. In a further example, a U-shaped trench may be laser cut or otherwise machined into a metal block to form the side walls of liquefier tube 58 and nozzle 64, which may then be covered with one or more metal membranes that encase the trench to form the inner channel.

The substantially-rectangular cross-section of liquefier tube 58 defines opposing faces 58*a* and 58*b*, which, in the shown embodiment are substantially planar faces that are sandwiched between the opposing heater assemblies 56*a* and 56*b*. This allows heater assemblies 56*a* and 56*b* to conductively transfer thermal energy to liquefier tube 58.

Liquefier tube 58 also has an inlet end 80*a* and an outlet end 80*b* offset from each other along longitudinal axis 73. Inlet end 80*a* is configured to receive filament 52 from drive mechanism 48, where inlet end 80*a* and filament 52 preferably have complementary cross-sectional geometries, such as discussed in Batchelder et al., U.S. Pat. Nos. 8,221,669 and 8,439,665. Outlet end 80*b* is the downstream portion of liquefier tube 68 and terminates in nozzle 64.

Suitable dimensions for liquefier tube 58 include those discussed in Batchelder et al., U.S. Pat. Nos. 8,221,669 and 8,439,665. In some preferred embodiments, liquefier tube 58 has a length ranging from about 0.3 inch to about 5 inches, more preferably from about 2 inches to about 4 inches. Suitable hollow, inner-channel thicknesses between planar faces 58*a* and 58*b* of liquefier tube 58 range from about 10 mils to about 100 mils, and in some embodiments from 30 mils to about 50 mils. Suitable hollow, inner-channel widths between the lateral ends of liquefier tube 58 (perpendicular to the inner-channel widths) range from about 100 mils to about 300 mils, and in some embodiments from 180 mils to about 220 mils. Suitable wall thicknesses for liquefier tube 58 range from about 5 mils to about 20 mils. Suitable dimensions for a cylindrical liquefier tube 58 are discussed below.

Thermal resistors 60*a* and 60*b* are a pair of opposing segmented blocks or assemblies of one or more materials having modest thermal conductivities to draw heat from liquefier tube 58 and heater assemblies 56*a* and 56*b*. As such, while heater assemblies 56*a* and 56*b* heat liquefier tube 58, thermal resistors 60*a* and 60*b* draw a portion of the generated heat away from heater assemblies 56*a* and 56*b*, which then conducts into arms 68*a* and 68*b* of clam block 54. Because clam block 54 is preferably fabricated from one or more thermally-conductive materials, the drawn heat conducts to base portion 70, which transfers the heat to heat pipe 50*a*. Heat pipe 50*a* accordingly draws the heat away from liquefier assembly 20. This creates the push-pull thermal driver arrangement.

This push-pull thermal driver arrangement is particularly identifiable when heater assemblies 56*a* and 56*b* reduce or discontinue heating liquefier tube 58 at one or more zones. When this occurs, thermal resistors 60*a* and 60*b* rapidly draw the residual heat away to quickly cool down liquefier tube 58 at these zones. This provides a high level of control over the temperature profile along liquefier tube 58, with fast thermal response times and cooling rates.

Suitable materials for thermal resistors 60*a* and 60*b* include sheet silicate materials, such as sheet mica. It has been found that fabricating thermal resistors 60*a* and 60*b* from materials such as sheet mica provides suitable levels of heat removal, while also providing good electrical insulation. Moreover, sheet mica is relatively soft and compliant, providing good mating interfaces between arms 68*a* and 68*b* of clam block 54 and heater assemblies 56*a* and 56*b*.

Additionally, the thermal conductivity of sheet mica in the cleavage planes of the material is about ten times greater than in directions perpendicular to the cleavage planes. As such, the sheet mica of thermal resistors 60*a* and 60*b* is preferably oriented such that the cleavage plains are arranged parallel to the planar faces of heater assemblies 56*a* and 56*b*. This allows thermal resistors 60*a* and 60*b* to provide sufficient levels of thermal resistance, while also allowing suitable amounts of heat to be transferred from heater assemblies 56*a* and 56*b* into clam block 54.

For example, if the overall thermal resistance between heater assemblies 56*a* and 56*b* and the core region of the filament material in liquefier tube 58 is R, then the fastest thermal response would be obtained for thermal resistors 60*a* and 60*b* that provide a thermal resistance of R between heater assemblies 56*a* and 56*b* and clam block 54. However, in many embodiments, the push-pull thermal driver arrangement of liquefier assembly 20 may operate with a reduced amount of thermal waste. Accordingly, thermal resistors 60*a* and 60*b* may exhibit thermal resistances between heater assemblies 56*a* and 56*b* and clam block 54 ranging from about R to about 20R, more preferably from about R to about 10R, and even more preferably from about R to about 5R.

In an alternative embodiment, thermal resistors 60*a* and 60*b* may be derived from one or more positive temperature coefficient (PTC) materials, such as barium titanate and/or lead titanate. PTC materials significantly increase their electrical resistance over small temperature ranges, thereby providing self-regulating temperature zones along liquefier tube 58. As such, a single block of a PTC material can emulate an infinite number of temperature zones for liquefier tube 58. In this case, clam block 54 is preferably electrically grounded and heating elements 82*a* and 82*b* of heater assemblies 56*a* and 56*b* are preferably omitted. Instead, the controlled and independent interaction between conductor traces 78*a* and 78*b* and the thermal resistors 60*a* and 60*b* derived from one or more PTC materials may effectively provide an infinite-zone liquefier, where individual zones may be selectively shut down.

In an alternative embodiment, liquefier assembly 20 may have one or more heating zones, each with a fixed operating temperature range as defined by the PTC-material thermal resistors 60*a* and 60*b*, with only the use of a pair of heater wires. In this case, heater assemblies 56*a* and 56*b* may optionally be omitted.

While illustrated with a pair of heater assemblies 56*a* and 56*b* and a pair of thermal resistors 60*a* and 60*b*, in some embodiments, such as those in which there is a sufficient amount of thermal conduction circumferentially around liquefier tube 58, a single heat assembly 56a and a single thermal resistor 60a may optionally be used. As such, liquefier assembly 20 may include one or more heater assemblies (e.g., heater assemblies 56a and 56b) and one or more thermal resistors or resistor blocks (e.g., thermal resistors 60a and 60b).

At the bottom of liquefier assembly 20, tip shield 62 is connected to the downstream ends of clam block 54 and heat pipe 50a. Tip shield 62 is thermally isolated from the nozzle 64 and liquefier tube 58 by an air layer or similar insulator. The surface of the tip shield 62 exposed to the part under construction should be relatively cooler, to reduce its surface energy and inclination to attract extrudate.

Nozzle 64 is a small-diameter nozzle of liquefier tube 58 at outlet end 80b, and is configured to extrude molten material at a desired road width. Preferred inner tip diameters for nozzle 64 include diameters up to about 760 micrometers (about 0.030 inches), and more preferably range from about 125 micrometers (about 0.005 inches) to about 510 micrometers (about 0.020 inches). In some embodiments, nozzle 64 may include one or more recessed grooves to produce roads having different road widths, as disclosed in Swanson et al., U.S. patent application Ser. No. 13/587,002.

As further discussed in Swanson et al., U.S. patent application Ser. No. 13/587,002, nozzle 64 may have an axial channel any suitable length-to-diameter ratio. For example, in some embodiments, nozzle 64 may have an axial channel with a length-to-diameter ratio to generate high flow resistance, such as a ratio of about 2:1 to about 5:1. In other embodiments, nozzle 64 may have an axial channel with a length-to-diameter ratio to generate lower flow resistance, such as a ratio less than about 1:1. Accordingly, suitable length-to-diameter ratios for the axial channel of nozzle 64 may range from about 1:2 to about 5:1, where in some low-flow resistance embodiments, ratios ranging from about 1:2 to about 1:1 may be preferred.

In the shown embodiment, sensors 66 are strain gauges secured to base portion 70 of clam block 54. As discussed below, sensors 66 are configured to measure compressions of base portion 70 due to ballooning expansions of liquefier tube 58 during operation. This allows the pressure within liquefier tube 58 to be operably measured at one or more regions along its length. Each sensor 66 preferably communicates with a control board of print head 18, a control board of head carriage 34, and/or with controller assembly 38 using one or more electrical, optical, and/or wireless communication lines, to relay pressure measurements in a real-time manner. For example, each sensor 66 may be formed on a flexible cable or otherwise attached to contacts on a flexible cable, where the flexible cable may then be operably connected to the control board of print head 18.

Sensors 66 are illustrated as being offset from each other along the length of base portion 70, where a first sensor 66 is located at top half of base portion 70, and a second sensor 66 is located at a bottom half of base portion 70. However, liquefier assembly 20 may include one or more sensors 66, located at any suitable location along the length of claim block 54. For instance, liquefier assembly 20 may include a single sensor 66 located at or near the downstream end of base portion 70 to operably measure the pressure within liquefier tube 58 adjacent to outlet end 80b and nozzle 64. Additionally, liquefier assembly 20 may include a second sensor 66 located at or near the upstream end of base portion 70 to operably measure the pressure within liquefier tube 58 adjacent to inlet end 80a. Furthermore, liquefier assembly 20 may include a third sensor 66 located at midpoint location of base portion 70 to operably measure the pressure within liquefier tube 58 at its midpoint region. An advantage of more than one pressure sensor may be the ability to infer the axial location of the meniscus region.

Figure 5:
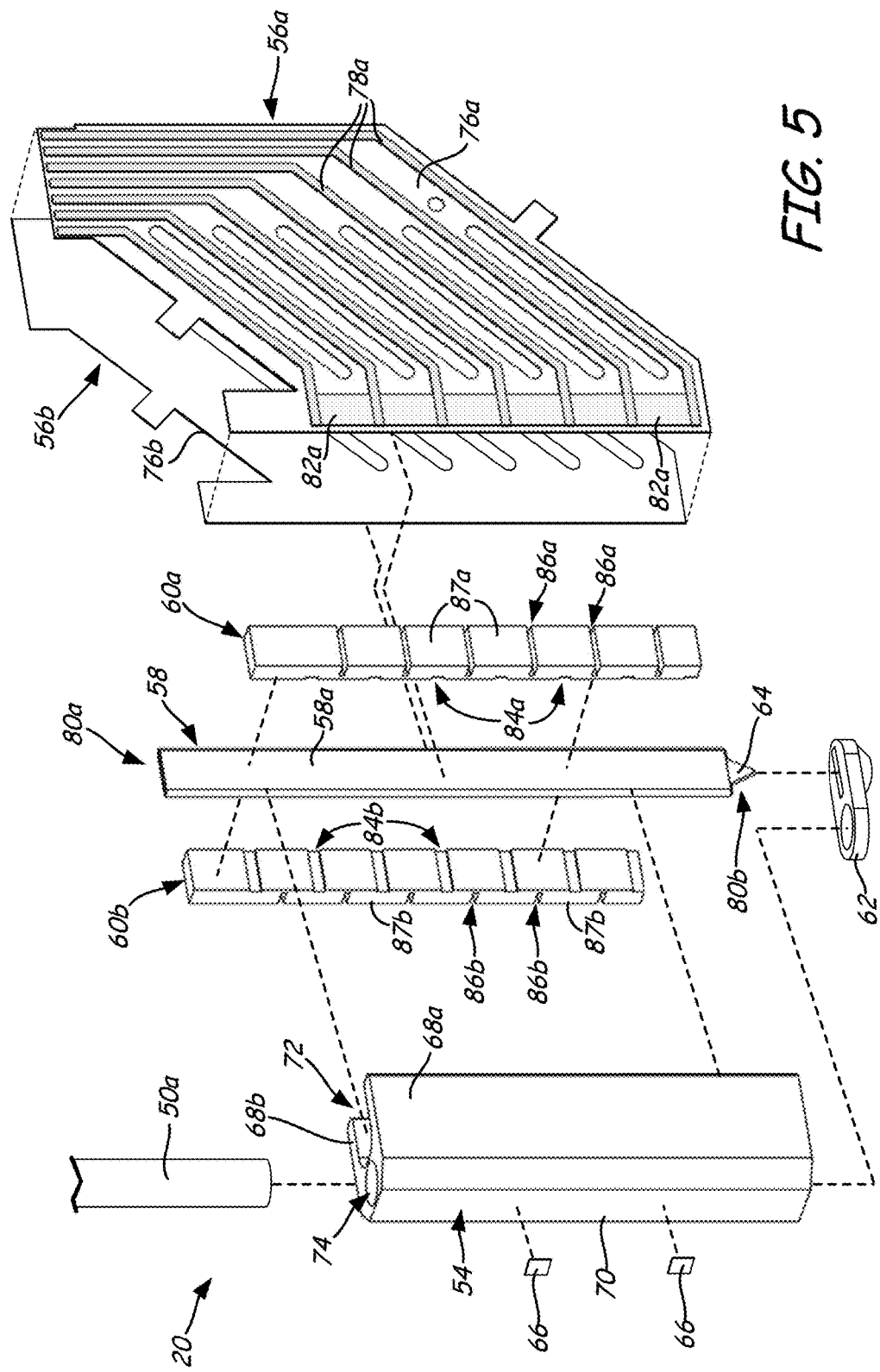
FIG. 5 is an exploded view of the liquefier assembly.
Figure 6:
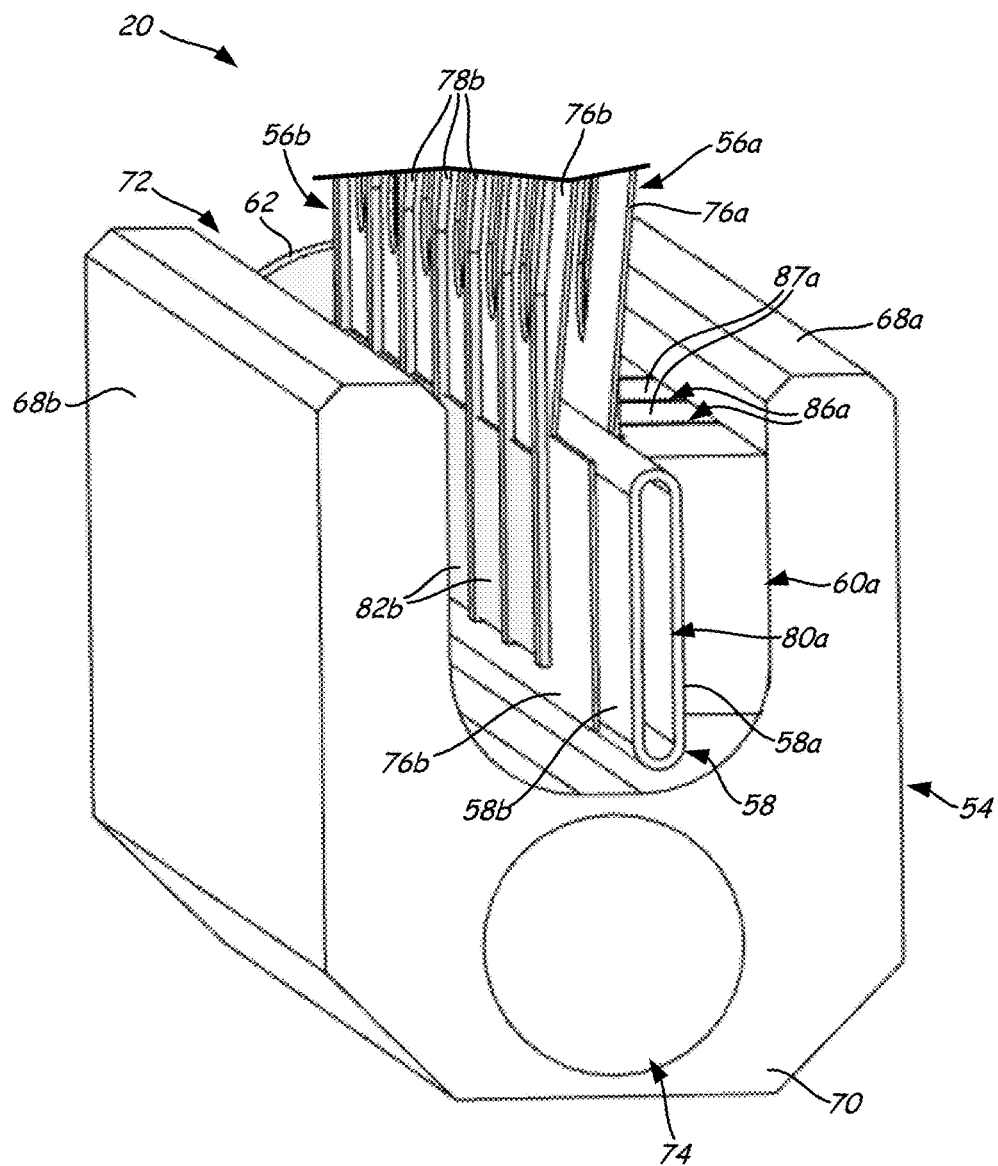
FIG. 6 is a top perspective view of the liquefier assembly, where one of the resistor blocks of the liquefier assembly is omitted to ease of viewing.

FIGS. 5 and 6 further illustrate liquefier assembly 20, where thermal resistor 60b is omitted in FIG. 6 for ease of viewing. As shown heating elements 82a (shown in FIG. 5) are first thin-film heaters disposed on shim portion 76a between adjacent conductor traces 78a, and heating elements 82b are second thin-film heaters disposed on shim portion 76b between adjacent conductor traces 78b. Heating elements 82a and 82b are the portions of heater assemblies 56a and 56b that generate heat in a zone-by-zone manner by the controlled and independent application of electrical power through conductor traces 78a and 78b.

As further shown in FIGS. 5 and 6, thermal resistors 60a and 60b respectively include a set of inner-facing indentations 84a and 84b that align with conductor traces 78a and 78b, and a set of outer-facing indentations 86a and 86b. Inner-facing indentations 84a and 84b provide clearance for conductor traces 78a and 78b, allowing the compression applied by clam block 54 to seat thermal resistors 60a and 60b against heating elements 82a and 82b. Similarly, outer-facing indentations 86a and 86b reduce thermal spreading along the longitudinal lengths of thermal resistors 60a and 60b (i.e., along longitudinal axis 73) to further thermally isolate the heating zones from each other.

In the shown example, thermal resistors 60a and 60b are each a segmented block that is separated by inner-facing indentations 84a and 84b and outer-facing indentations 86a and 86b. In particular, outer-facing indentations 86a and 86b respectively divide thermal resistors 60a and 60b into thermally-isolated segments 87a and 87b. However, in alternative embodiments, thermal resistors 60a and 60b may each be an assembly of distinct segments 87a and 87b that are physically separate from each other.

Figure 7:
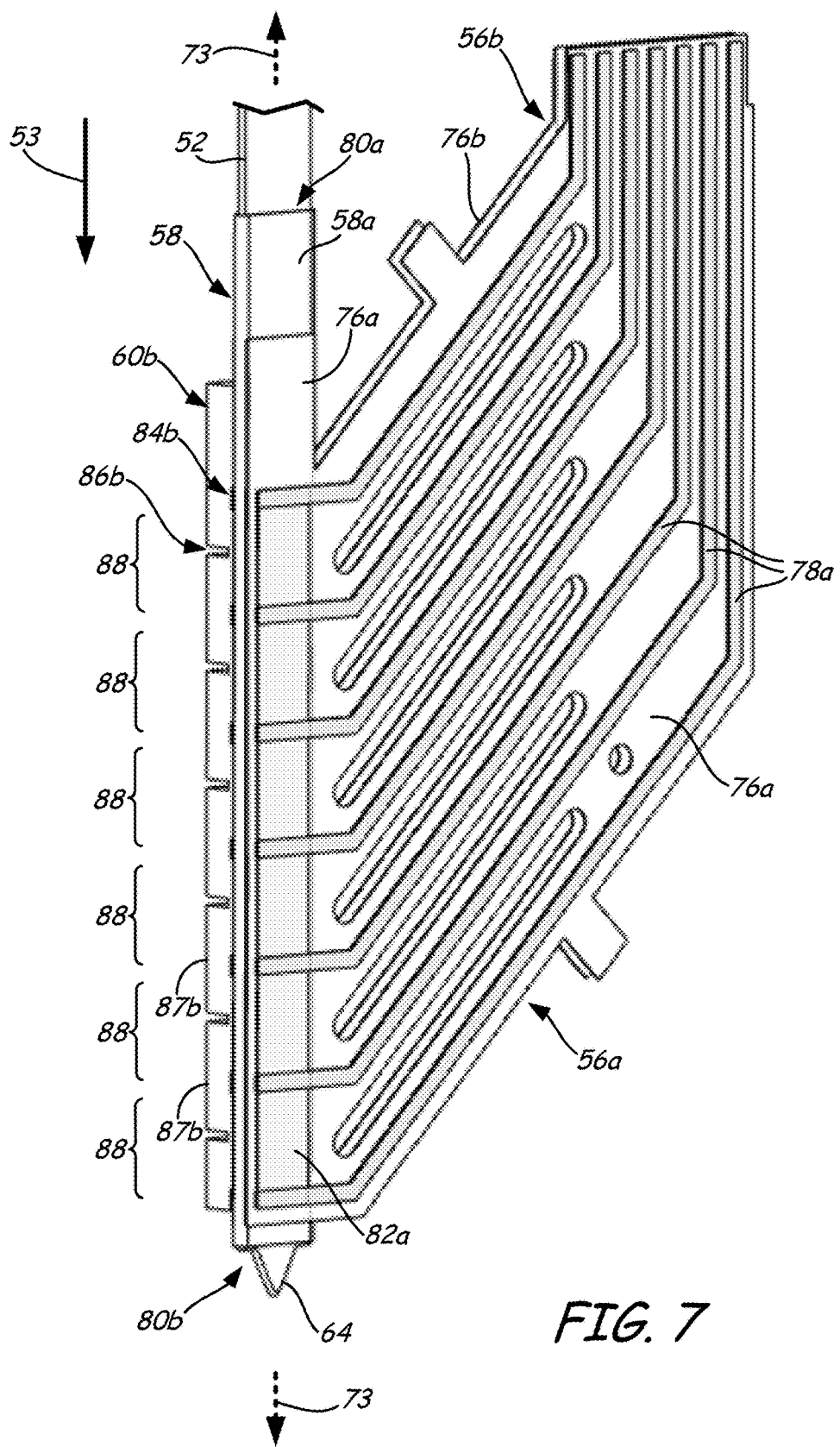
FIG. 7 is a rear, right perspective view of a liquefier tube, a resistor block, and heater assemblies of the liquefier assembly, illustrating a multiple heating zone arrangement for dynamically controlling heat flows.

As shown in FIG. 7, this arrangement of heater assemblies 56a and 56b and thermal resistors 60a and 60b provides six heating zones 88 that extend along the length of liquefier tube 58. Each heating zone 88 extends longitudinally between adjacent conductor traces 78a, and between adjacent conductor traces 78b, where heating elements 82a and 82b are in contact with segments 87a and 87b of thermal resistors 60a and 60b. As mentioned above, this thermally isolates each heating zone 88 from the adjacent heating zones 88, while also allowing thermal resistors 60a and 60b to draw heat from the respective heating zones 88. In alternative embodiments, conductor traces 78a and 78b, and heating elements 82a and 82b, may face inwardly against faces 58a and 58b of liquefier tube 58.

Heater assemblies 56a and 56b preferably function as their own temperature sensors for each heating zone 88 based on the resistance of heating elements 82a and 82b in each heating zone 88. This allows controller assembly 38 to control the temperature of each heating zone 88 in an independent and closed-loop manner. For example, each heating zone 88 may be controlled with a half H-bridge driver, which can provide a pulse-width modulation drive plus temperature sensing for each heating zone 88. This high level of temperature control in each heating zone 88 reduces the risk of thermally degrading the filament material and heating elements 82a and 82b, even at high material flow rates, and allows dynamic heating to be conducted, as discussed below. This reduces the number of electrical traces required, compared to utilizing separate temperature sensors, and improves noise immunity, since the temperature is measured as a change in a large current.

During a printing operation, controller assembly 38 may direct print head 18 to independently relay electrical power through conductor traces 78a and 78b to heat up heating elements 82a and 82b to individual set point temperatures within each heating zone 88 (or to float to define adiabatic regions). For example, heating elements 82a and 82b may generate from zero to about 20 watts per heating zone 88 (for a total of about 120 watts), where the wattage may be independently controlled for each heating zone 88.

The majority of the heat generated from heating elements 82a and 82b is transferred to liquefier tube 58 and the filament 52 retained therein. This produces a desired temperature profile along liquefier tube 58, which can rapidly heat and melt the material of filament 52 to a molten state for extrusion. Interestingly, it has been found that the heat uptake by the filament material in liquefier tube 58 is non-uniform along longitudinal length 73. In particular, it has been found that the majority of the heat transferred in an isothermal-wall situation is located just downstream of the meniscus. Upstream from the meniscus, very little heat is transferred because of the small air gap between filament 52 and the wall of liquefier tube 58. Moreover, downstream of the meniscus, the heat transferred drops in an approximately exponential manner.

Within liquefier tube 58, the ribbon architecture minimizes the distance that the heat needs to transfer through filament 52 to reach its core region at each heating zone 88 (e.g., compared to a cylindrical filament). As such, the transferred heat can quickly melt filament 52. For example, based on the zero$^{th}$ order characteristic time to melt ribbon filament 52, for a ribbon filament 52 having a 40-mil thickness, and an ABS material composition with a diffusivity of 230 mil$^2$/sec, the melt time is about 0.44 seconds. As such, the first order estimate indicates that the molten ABS material can traverse a 2-inch long heated liquefier tube 58 in about 0.44 seconds. This corresponds to an extrudate flow rate of about 4,500 micro-cubic inches (mics)/second without thermally degrading the ABS material.

Furthermore, heat pipe 50a can remove a substantial amount of heat when liquefier assembly 20 is cooled down. For example, when all heating zones 88 are operating at about 300° C., the heat drawn through thermal resistors 60a and 60b, clam block 54, and heat pipe 50a can maintain clam block 54 at about 80° C. with a heat removal rate through heat pipe 50a of about 12 watts. Therefore, when the electrical power relayed to heating elements 82a and 82b is stopped, heating zones 88 can rapidly cool back down to about 80° C. in a few seconds. This rapid heat removal can substantially reduce the effects of nozzle oozing that can otherwise occur when the cool down rate is slower.

The combination of heat sink unit 50 and clam block 54 also provides a unique design for determining the amount of heat that is transferred to the filament material in liquefier tube 58. Knowing the amount of heat transfer (e.g., joules) to the filament material can assist in controlling the amount of extrusion that is generated by the thermal expansion of the filament material. On the input side, the amount of heat transferred to the filament material from heater assemblies 56a and 56b is readily determined by the electrical power applied to each heater assembly 82a and 82b.

However, to determine the amount of heat transferred to the filament material, the amount of heat being drawn into clam block 54 also needs to be known. This is achievable when clam block 54 (or other rigid member) is held at a substantially constant temperature, which itself is achievable with heat sink unit 50. In fact, heat sink unit 50 is capable of holding clam block 54 within about a few degrees of the temperature of heat sink 50b, effectively thermally grounding clam block 54. In comparison, liquefier assemblies that function without heat sink unit 50, the temperature of clam block can vary by as much as 70° C. under the same conditions. As such, heat sink unit 50 also provides a unique mechanism for determining thermal expansion properties of the filament material in liquefier tube 58. This accordingly provides greater control over the extrusion rates of the filament material.

As mentioned above, a second embodiment of the present disclosure is directed to a method for dynamically controlling the heat flow transferred to and from liquefier tube 58 over multiple heating zones 88. Historically, temperature control of a liquefier tended to hold the entire length of the liquefier at a single set point temperature, typically at a desired exiting temperature. While this reduced the risk of thermal degradation of the consumable material, it also limited the material flow rates through the liquefier.

Typically, when a filament is fed into a heated liquefier, the surface of the filament begins to heat up and melt, while the core region of the filament remains relatively cool. This is because the received thermal energy requires a sufficient amount time to conduct from the surface of the filament to melt the core region of the filament. As such, if the filament is being fed to the liquefier at a rate that is faster than this conductance time, the core region of the filament will not sufficiently melt before the given segment of the filament reaches the extrusion nozzle. As can be appreciated, this can result in extrudate with poor adhesion to the previously deposited material, or potentially a clogged nozzle.

One conventional technique for increasing material flow rates through the liquefier involves setting the temperature control point at the top of the liquefier. However, in some situations, when the filament is fed quickly into the liquefier, the thermocouple tends to chill such that the control loop naturally overheats the mid-region of the liquefier. So, while this technique is good for increasing material flow rates through the liquefier, it can also potentially thermally degrade the filament material.

Liquefier assembly 20, however, having multiple heating zones 88 that are capable of being independently controlled, allows dynamic adjustments to be made to the thermal profile along the longitudinal length of liquefier tube 58 to account for flow rate changes and other non-steady state conditions that occur during a printing operation (e.g., starting, stopping, accelerating, and decelerating). This can further improve response times and flow rates during printing operations, while also reducing the risk of thermally degrading the part or support material.

This dynamic heating method involves adjusting the temperatures of heating zones 88 based on the desired material flow rate through liquefier tube 58 in an open-loop or closed-loop manner, more preferably in a closed-loop manner. In particular, heating zones 88 preferably have temperatures that are similar or substantially the same at low flow rates. This produces a substantially constant temperature profile along liquefier tube 58. However, as the flow rate increases, the temperatures between heating zones 88 are preferably varied to increase the rate at which the filament material melts within liquefier tube 58, while also reducing the risk of thermally degrading the material.

Figure 8A:
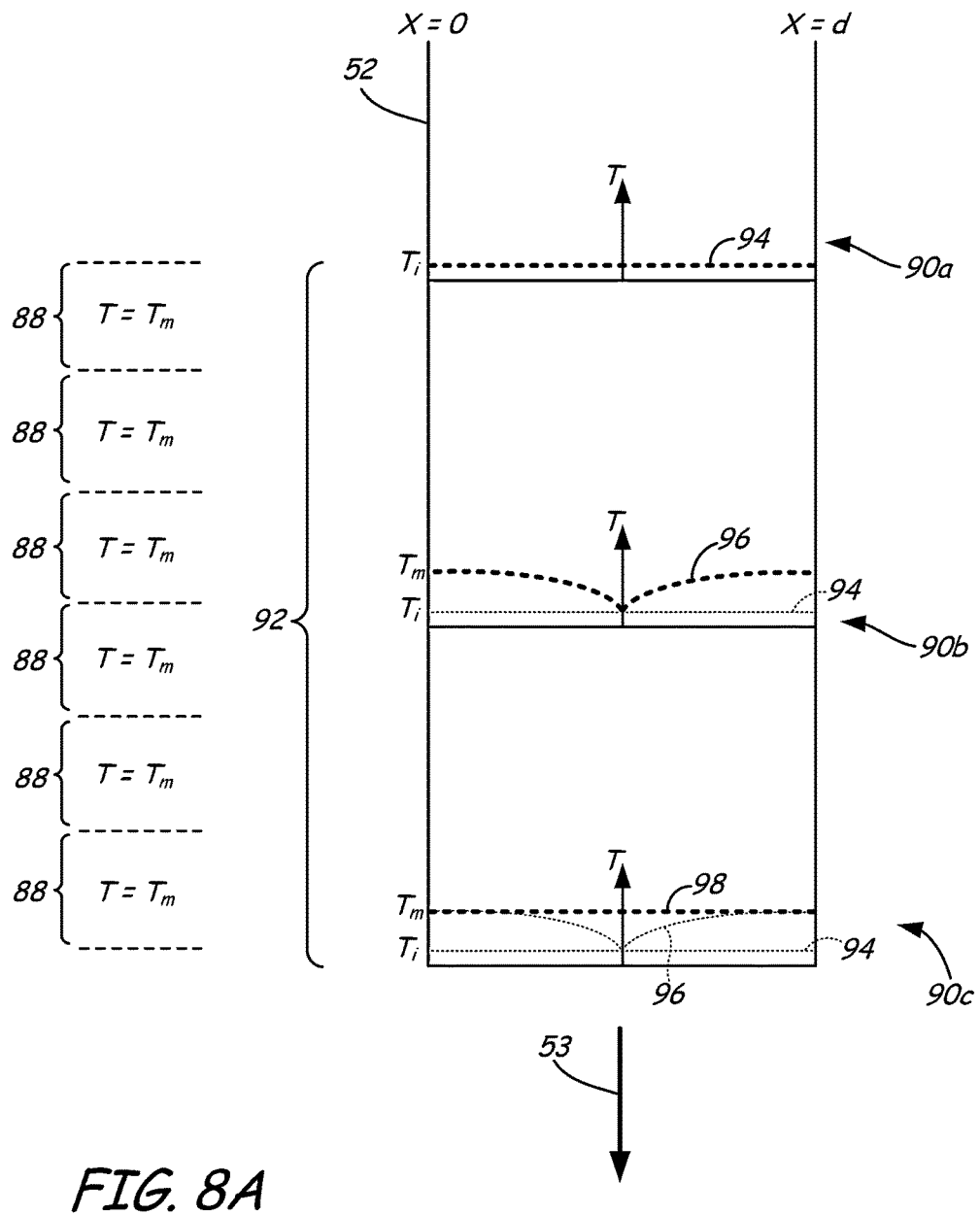
FIGS. 8A and 8B are schematic illustrations of a filament thickness cross-section and associated thermal profiles as the filament passes through a liquefier tube, depicting dynamic adjustments made to heating zones in the liquefier tube to accommodate changes in material flow rates.

For example, FIG. 8A illustrates a low flow rate situation, where the right-side plots 90a-90c represent the cross-sectional temperature profiles of the material of filament 52 as it passes through liquefier tube 58 in the direction of arrow 53. The cross-section is taken along the thickness of filament 52, between faces 58a and 58b of liquefier tube 58, where filament 52 has a thickness d (ranging from x=0 to x=d).

In this situation, heating zones 88 may be heated to substantially the same temperature to generate a substantially constant temperature profile 92 along liquefier tube 58. Preferably, as shown in FIG. 8A, each heating zone 88 may be heated to a target temperature $T_m$ for the filament material, such as a suitable melting temperature for extruding the material from nozzle 64. For instance, for an ABS filament material, each heating zone 88 may be heated to a target temperature $T_m$ about 240° C.

Filament 52 is fed to liquefier tube 58 at an initial temperature $T_i$ (e.g., ambient temperature), as shown by thermal profile 94 in plot 90a. As filament 52 passes through liquefier tube 58, the surface region of filament 52 at x=0 and x=d is heated to the target temperature $T_m$. In comparison, the core region of the material remains cooler due to the delayed thermal transfer. This results in a thermal profile 96 shown in plot 90b. As shown in plot 90c, the heat eventually travels to the core region of the material to provide a uniform thermal profile 98 at the target temperature $T_m$. Because the flow rate through liquefier tube 58 is low, the thermal energy has sufficient time to conduct from the surface region of the filament material to the core region, thereby melting the entire filament 52 before it reaches nozzle 64. Additionally, the lower temperature (well below the thermal-degradation kinetics threshold (TDKT) of the filament material) reduces the risk of thermally degrading the filament material, despite the longer residence time in liquefier tube 58.

However, when an increased material flow rate is desired, the temperature profile along liquefier tube 58 may be varied to impart heat to filament 52 more quickly than the constant temperature profile 92. This is achievable because, even though the consumable material of filament 52 is heated to an elevated temperature, the exposure duration at the elevated temperature is reduced, allowing the filament material to remain below its TDKT.

The TDKT is a time-temperature parameter that defines a rate of thermal degradation of a polymeric material, such as by depolymerization, backbone chain scission, pendant-group stripping, and/or oxidation processes. The TDKT reaction rate typically follows the first-order Arrhenius equation, which is substantially linear with time and exponential with temperature. As an example, for a filament material exposed to a given heating temperature for a given duration, increasing the exposure temperature by a small amount (e.g., about 10° C.) and reducing the exposure duration by about 50% (i.e., doubling the flow rate) may net about the same thermal reaction rates on the filament material, although the particular net thermal effects may vary depending on the filament material composition.

In general, a filament material will remain thermal stable (i.e., substantially no thermal degradation) as long as it remains below its TDKT. It is understood that the substantially linear time relationship of the TDKT is typically cumulative, where multiple exposures to brief temperature increases, each of which may be below the TDKT of the material, will eventually accumulate in duration to exceed the TDKT. However, this typically does not occur in liquefier assembly 20 due to the consumable nature of filament 52. In other words, the material of filament 52 is typically only exposed to the elevated temperature(s) in liquefier tube 58 a single time before being extruded to produce 3D part 22 or support structure 24. Occasionally, the filament material may be heated in liquefier assembly 20 more than once, such as between printing runs and/or between printed layers, where heating zones 88 may be cooled down and heated up again. Nonetheless, the number of heating cycles remains low, such that the filament material remains below its TDKT.

In order to substantially increase the flow rate of the filament material through liquefier tube 58, filament 52 needs to be heated to a significantly higher temperature than the target temperature $T_m$ to drive enough thermal energy into filament 52. For example, when a material flow rate of about 10 mics/second is increased to a flow rate of about 10,000 mics/second (i.e., an increase of about three orders of magnitude), the increase in temperature can exceed the target temperature $T_m$ by 100° C. or more.

This increased heating, however, presents an issue with respect to the TDKT of the filament material. Once heated to this elevated temperature, the surface region of the filament material typically does not have sufficient time to cool down solely by adiabatic thermal diffusion before it begins to thermally degrade (i.e., it will exceed its TDKT). This issue illustrates one of the advantages of the dynamic thermal control attainable with liquefier assembly 20.

Figure 8B:
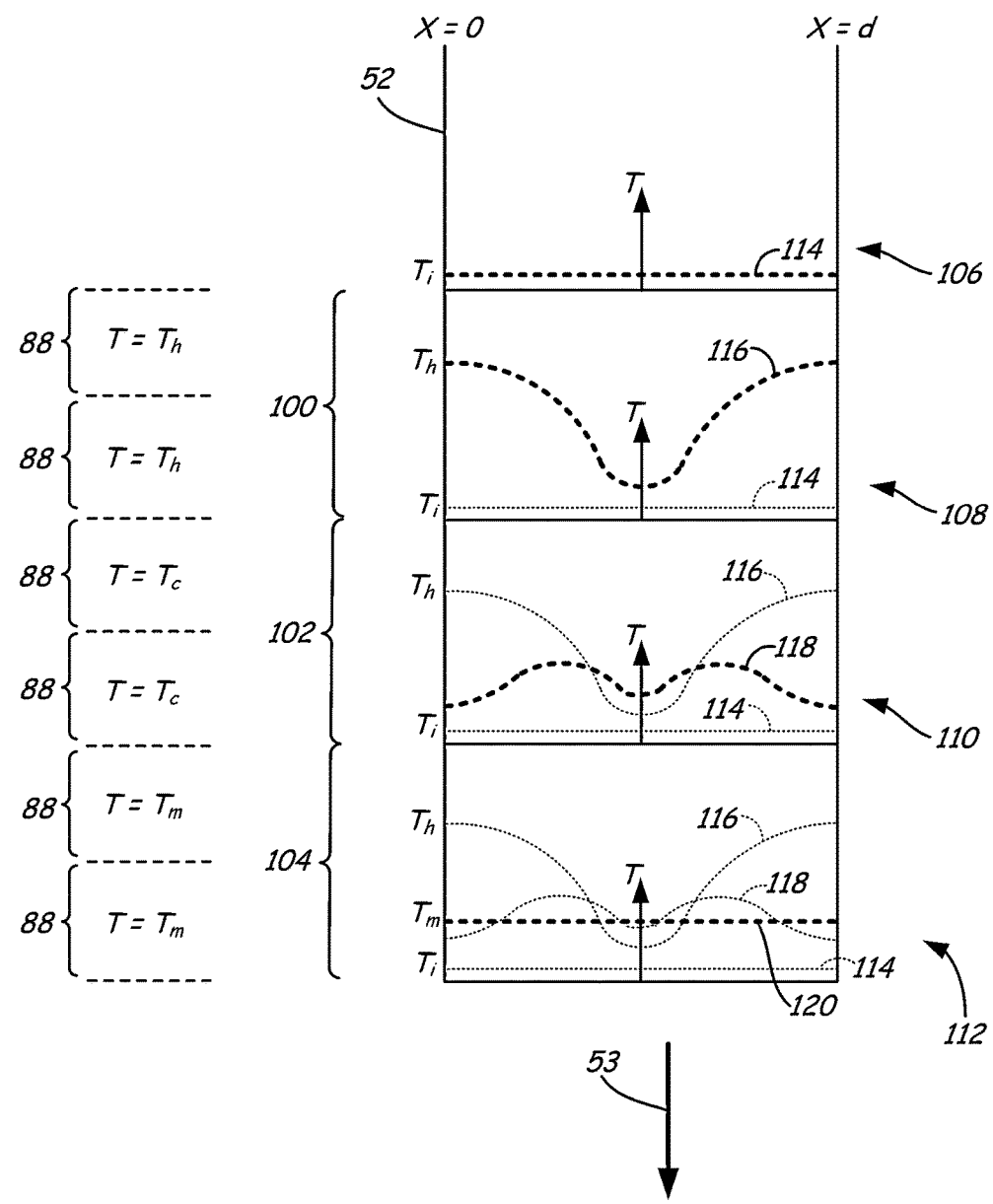

As shown in FIG. 8B, the increased heating can be achieved in a thermally-stable manner by initially overshooting the surface temperature of filament 52, followed by an undershooting of this temperature. In particular, one or more of the upstream heating zones 88 may be heated to an elevated temperature $T_h$ to define heated region 100.

For example, for a ribbon filament 52 having a thickness d, an initial ambient temperature $T_i$, a thermal diffusivity κ, and which is being fed to liquefier tube 58 in the direction of arrow 53 at a velocity $v_p$, the thermal diffusion may be generically described as a system bounded by two parallel planes. As such, the temperature distribution in heated region 100, $T_{region}(x,t)$, may be solved as a relatively simple case of uniform initial temperature and constant wall temperature, as follows:

$$T_{region}(x,t) = T_h - \frac{4}{\pi}(T_h - T_i) \sum_{n=0}^{\infty} \frac{1}{2n+1} \sin\left(\frac{(2n+1)\pi x}{d}\right) \exp\left\{\frac{-\kappa(2n+1)^2\pi^2 t}{d^2}\right\}$$ (Equation 1)

where $T_h$ is the temperature of the heating zones 88 in heated region 100.

The thermal power density $P_h(z)$ that is transferred to the filament material accordingly varies with position z along heated region 100, as follows:

$$P_h(z) = 2k_p \left(\frac{\partial}{\partial x} T_{region}(x,t)\right)\bigg|_{x=0}$$ (Equation 2)

where the position z is the product of time t and the filament velocity $v_p$. Combining Equations 1 and 2 provides the following:

$$P_h(z) = \frac{8}{d}(T_h - T_i)k_p \sum_{n=0}^{\infty} \exp\left\{\frac{-\kappa(2n+1)^2\pi^2 z}{d^2 v_p}\right\}$$ (Equation 3)

The accumulated thermal energy $J_h(z)$ transferred to the filament material may be represented as follows:

$$J_h(z) = \int_0^z \frac{\partial z'}{v_p} P_h(z') \quad \text{(Equation 4)}$$

Combining Equations 3 and 4 provides the following:

$$J_h(z) = \quad \text{(Equation 5)}$$
$$\frac{8d}{\pi^2 \kappa}(T_h - T_i)k_p \sum_{n=0}^{\infty} \frac{1}{(2n+1)^2}\left(1 - \exp\left\{\frac{-\kappa(2n+1)^2\pi^2 z}{d^2 v_p}\right\}\right)$$

The required thermal energy density $J_m$ to heat filament 52 enough such that, if the heat is then allowed to diffuse uniformly (e.g., in outlet region 104), the entire thickness d will be at the target temperature $T_m$, may be represented as follows:

$$J_m = (T_m - T_i)d\, Cp\, \rho \quad \text{(Equation 6)}$$

where here Cp is the heat capacity per mass, and $\rho$ is the mass per volume. Since $$\kappa = \frac{k_p}{Cp\,\rho},$$

Equation 6 may be represented as follows:

$$J_m = (T_m - T_i)d\frac{k_p}{\kappa} \quad \text{(Equation 7)}$$

Accordingly, the required thermal energy transfers to the filament material as follows:

$$T_m - T_i = \quad \text{(Equation 8)}$$
$$\frac{8}{\pi^2}(T_h - T_a)\sum_{n=0}^{\infty} \frac{1}{(2n+1)^2}\left(1 - \exp\left\{\frac{-\kappa(2n+1)^2\pi^2 z_h}{d^2 v_p}\right\}\right)$$

where $z_h$ is the length of heated region 100 along longitudinal axis 73. Correspondingly, to estimate the required length $z_h$ of heated region 100, the n=0 term in Equation 8 may be expanded as follows:

$$T_m - T_i = 8(T_h - T_i)\left(\frac{\kappa\, z_h}{d^2\, v_p}\right) \quad \text{(Equation 9)}$$

$$z_h = \frac{T_m - T_i}{T_h - T_i} \frac{d^2 v_p}{8\,\kappa} \quad \text{(Equation 10)}$$

Accordingly, for a ribbon filament 52 having a width w, the maximum volumetric flow produced by liquefier tube 58 having heated region 100 is as follows:

$$Q_{flow} = w\, d\, z_h \quad \text{(Equation 11)}$$

Equations 10 and 11 illustrate the relationship between the elevated temperature $T_h$ of heated region 100 and the material flow rate. This elevated heating in heated region 100 is then followed by a cooled region 102, in which the electrical currents applied to the associated heating elements 82a are substantially reduced. This allows thermal resistors 60a and 60b to rapidly draw thermal energy from the surface region of the filament material at these associated heating zones 88. This accordingly prevents the filament material from thermally degrading by exposing filament 52 to the elevated temperature $T_h$ for only a brief duration (i.e., the filament material remains below its TDKT at all times).

In comparison, the downstream heating zones 88 may be set to the target temperature $T_m$ to define outlet region 104. These temperature adjustments between heated region 100, cooled region 102, and outlet region 104 may be conducted by shifting the amount of electrical power relayed to heating elements 82a and 82b such that the upstream conductor traces 78a and 78b relay greater amounts of electrical power to the heating elements 82a and 82b at heated region 100 compared to the downstream conductor traces 78a and 78b for cooled region 102 and outlet region 104. In some embodiments, one or more of the heating zones 88 in outlet region 104 may float with the surface temperature of the filament material, such that outlet region 104 functions as an adiabatic region.

This thermal profiles achieved by heated region 100, cooled region 102, and outlet region 104 are illustrated by the cross-sectional plots 106-112 in FIG. 8B. For instance, as shown in plot 106, when filament 52 enters liquefier tube 58, the material of filament 52 has a substantially uniform thermal profile 114 along its thickness at its initial temperature $T_i$. In other words, plot 106 is the same as plot 90a (shown in FIG. 8A).

However, while passing through heated region 100, the surface regions at x=0 and x=d are heated to the elevated temperature $T_h$. In comparison, the core region of the material (i.e., at about x=d/2) remains cooler due to the delayed thermal transfer. As shown in plot 108, this results in a thermal profile 116 as the given segment of the filament material exits heated region 100 and enters cooled region 102.

As briefly mentioned above, the heating zones 88 in cooled region 102 preferably operate at lower temperatures (or are unheated) to allow thermal resistors 60a and 60b to rapidly draw excess amounts of the thermal energy from the filament material. This quickly cools down the surface regions of the filament material edges at x=0 and x=d to ensure that the filament material remains below its TDKT. However, as shown in plot 110, this thermal transfer also takes time to travel through the filament material, which generates thermal profile 118 as a thermal wave across the cross-section of the filament material. In particular, this thermal wave of profile 118 exhibits temperature peaks at locations between the surface regions (i.e., x=0 and x=d) and the core region (i.e., x=d/2).

As the filament material passes through outlet region 104, the heat retained at the temperature peaks in the thermal wave diffuses uniformly (inwardly and outwardly) to the target temperature $T_m$, as illustrated by a substantially uniform thermal profile 120 in plot 112. The use of heated region 100 and cooled region 102 in this manner allows the filament material to be rapidly melted, while also only exposing the material to the elevated temperature $T_h$ for a very brief duration. In particular, cooled region 102 cools the surface regions of the filament material down to reduce the risk of thermally degrading the material. This accordingly launches a thermal wave through the filament material and allows high material flow rates to be achieved.

Accordingly, when an increase in material flow rate through liquefier tube 58 is desired, the temperature in heated region 100 is increased, and the temperature in cooled region 102 is reduced, where the difference in temperatures between heated region 100 and cooled region 102 may increase with an increase in the material flow rate. This accordingly launches the thermal wave, as discussed above.

On the other hand, when the material flow rate is reduced (i.e., the exposure time is increased), the temperature in heated region 100 is preferably reduced as well to prevent the filament material from exceeding its TDKT. The temperature in cooled region 102 may also be increased as the material flow rate drops to further reduce the temperature difference between heated region 100 and cooled region 102. This trend may continue until the temperature in each region 100, 102, and 104 is at about the target temperature $T_m$. Due to their ability to dynamically adjust the temperatures of heating zones 88 independently of each other in a closed-loop manner, heater assemblies 56a and 56b are particularly suitable for generating these types of temperature profiles. Additionally, controller assembly 38 may operate heater assemblies 56a and 56 to generate a variety of different temperature profiles along liquefier tube 58, as particular thermal requirements may dictate.

In comparison, as discussed above, a statically-heated liquefier can typically extrude consumable materials at relatively low flow rates in a thermally-stable manner, or extrude the consumable materials at higher flow rates, but in a less or non-thermally stable manner. However, these liquefiers are typically not capable of achieving both of these outcomes. Liquefier assembly 20, however, can achieve both of these outcomes, in addition to generating a variety of other closed-loop, dynamic temperature profiles along liquefier tube 58. As such, liquefier assembly 20 can accommodate a wide variety of material flow rates with good response times and minimized or otherwise reduced risk of thermal degradation.

Figure 9:
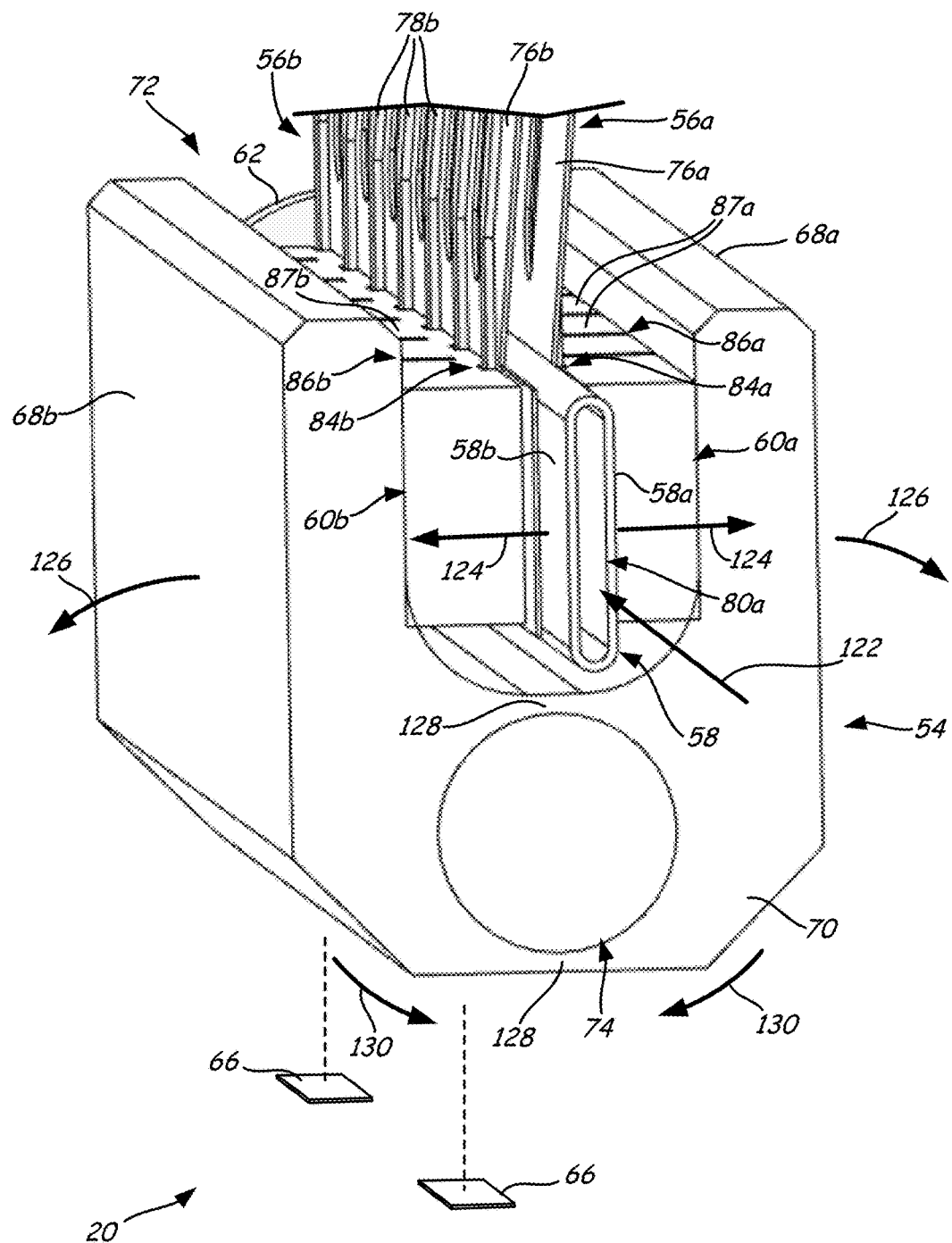
FIG. 9 is a top perspective view of the liquefier assembly, illustrating a technique for operably measuring pressure within a liquefier tube of the liquefier assembly based on liquefier tube expansion and clam block flexing and compression.

As mentioned above, base portion 70 of clam block 54 may compress due to ballooning expansions of liquefier tube 58 during operation, which allows sensors 66 (e.g., strain gauges) to operably measure the pressure within liquefier tube 58. As shown in FIG. 9, during a printing operation, the heating of liquefier tube 58 melts successive segments of filament 52. The molten portion accordingly forms a meniscus around the unmelted portion of filament 52. As drive mechanism 48 feeds filament 52 into inlet end 80a of liquefier tube 58 (illustrated by arrow 122), the downward movement of filament 52 functions as a viscosity pump to extrude the molten material from nozzle 64 for printing 3D part 22 or support structure 24.

However, the melting of filament 52 causes the consumable material to thermally expand within liquefier tube 58. This, combined with the viscosity pump action of filament 52, pressurizes liquefier tube 58, typically at or below the location of the meniscus. In fact, liquefier tube 58 can be subjected to pressures exceeding about 7 megapascals, which can cause the faces 58a and 58b of liquefier tube 58 to balloon outward depending on where the pressurization is located, as illustrated by arrows 124. This ballooning effect of liquefier tube 58 presses heater assemblies 56a and 56b, and thermal resistors 60a and 60b outward in the same directions. This flexes arms 68a and 68b of clam block 54 outward, as illustrated by arrows 126.

As can be seen in FIG. 9, the machining of shaft 74 in base portion 70 reduces the solid volume of base portion 70 and provides relatively thin regions 128. These thin regions 128 in turn allow base portion 70 to compress when arms 68a and 68b flex, as illustrated by arrows 130. Sensors 66 may accordingly detect the strain applied to base portion 70 when base portion 70 is compressed in this manner.

It is understood that the flexing of arms 68a and 68b, and the compression of base portion 70 are relatively small and do not plastically deform or fracture clam block 54. However, sensors 66 are capable of detecting very small compression changes in base portion 70, and correlate these compression changes to pressures within liquefier tube 58 to an accuracy of about one pound/square-inch. Because the extrudate flow rate is based in large part on the pressure within liquefier assembly 20 due to the viscosity pump action, and due to material expansion upon melting, these measured pressures allow liquefier assembly 20 to be operated in a closed-loop manner with one or more process control loops to provide flow control feedback.

As briefly discussed above, changes in the material flow rate of the extrudate, such as material flow accelerations at start up points, material flow decelerations and accelerations around corners, and material flow decelerations at stopping points, is controlled by changing the feed rate of filament 52 with drive mechanism 48, based on drive commands from controller assembly 38. However, the flow rate of the extrudate out of nozzle 64 does not always respond the same to changes in the feed rate of filament 52, and exhibits a response time delay after the change in feed rate.

It has been found that the response time for material flow accelerations can be very quick (e.g., about 10 milliseconds or less). As such, liquefier assembly 20 may operate with good response times and flow control during material flow accelerations at start up points and material flow accelerations around corners, for example. This is illustrated by flow plot line 132 and encoder plot line 134 in FIG. 10, where flow plot line 132 is a plot of extrudate velocities exiting a print head nozzle (e.g., nozzle 64), as measured with velocimetry as described in Batchelder, U.S. patent application Ser. No. 13/840,538.

Encoder plot line 134 is a corresponding plot of a filament drive mechanism encoder, where the filament drive mechanism was switched on and off in a step-wise manner to generate pulses of extrudate flow accelerations and decelerations. In particular, encoder plot line 134 corresponds to feed rates for feeding a filament (e.g., filament 52) to a liquefier, which includes leading edges 134a corresponding to when the filament feed rate is accelerated from zero to a given feed rate, and trailing edges 134b corresponding to when the filament feed rate is decelerated from the given feed rate to zero.

Figure 10:
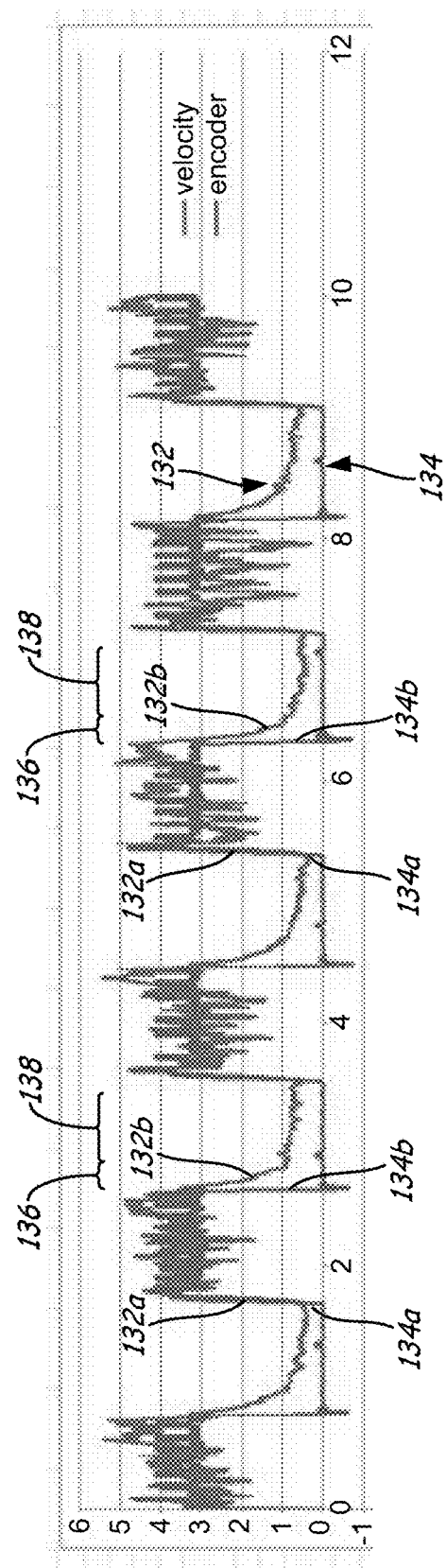
FIG. 10 is a graphical plot of extrudate velocities and encoder signals, illustrating material flow acceleration and deceleration response times.

As further shown in FIG. 10, as the filament feed rate into the liquefier quickly accelerates (i.e., at leading edge 134a), the extrudate velocity exiting the liquefier also accelerates very quickly, as illustrated by leading edges 132a. In particular, leading edges 132a of extrudate plot line 132 closely match the leading edges 134a of encoder plot line 134a.

However, when the filament drive mechanism is stopped and the filament feed rate into the liquefier quickly decelerates to zero (at trailing edge 134b), the extrudate velocity exiting the liquefier exhibits delayed and complex flow decelerations, as illustrated by trailing edges 132b. It has been further recognized that these complex flow decelerations include fast decay portions 136 (e.g., less than 20 milliseconds) and slow decay portions 138 (e.g., greater than 100 milliseconds).

These slow decay portions 138 are unexpected, and as shown in FIG. 10, do not exhibit a completely repeatable pattern over the successive decelerations. This unpredictability in the flow deceleration accordingly reduces the control over the material flow, such as when slowing down and stopping at the ends of roads.

To compensate for the unpredictability in flow decelerations, the pressure in liquefier tube 58 that is operably measured by sensors 66 can be used to predict the extrudate flow rate that exits nozzle 64 in a closed-loop manner with one or more process control loops. As such, controller assembly 38 preferably operates in a manner that utilizes the measured pressures in liquefier tube 58 to provide flow control feedback to predict variations in the extrudate flow rate when liquefier assembly 20 is operating in steady state and non-steady state conditions. For instance, controller assembly 38 may adjust the feed rate of filament 52 (via drive mechanism 48) and/or the temperatures of the heating zones 88 along liquefier tube 58 (via heater assemblies 56a and 56b) in response to the operably measured pressure. This can also improve response times during printing operations, allowing print head 18 to produce 3D part 22 and/or support structure 24 with high part resolutions and fast printing rates.

Figure 11:
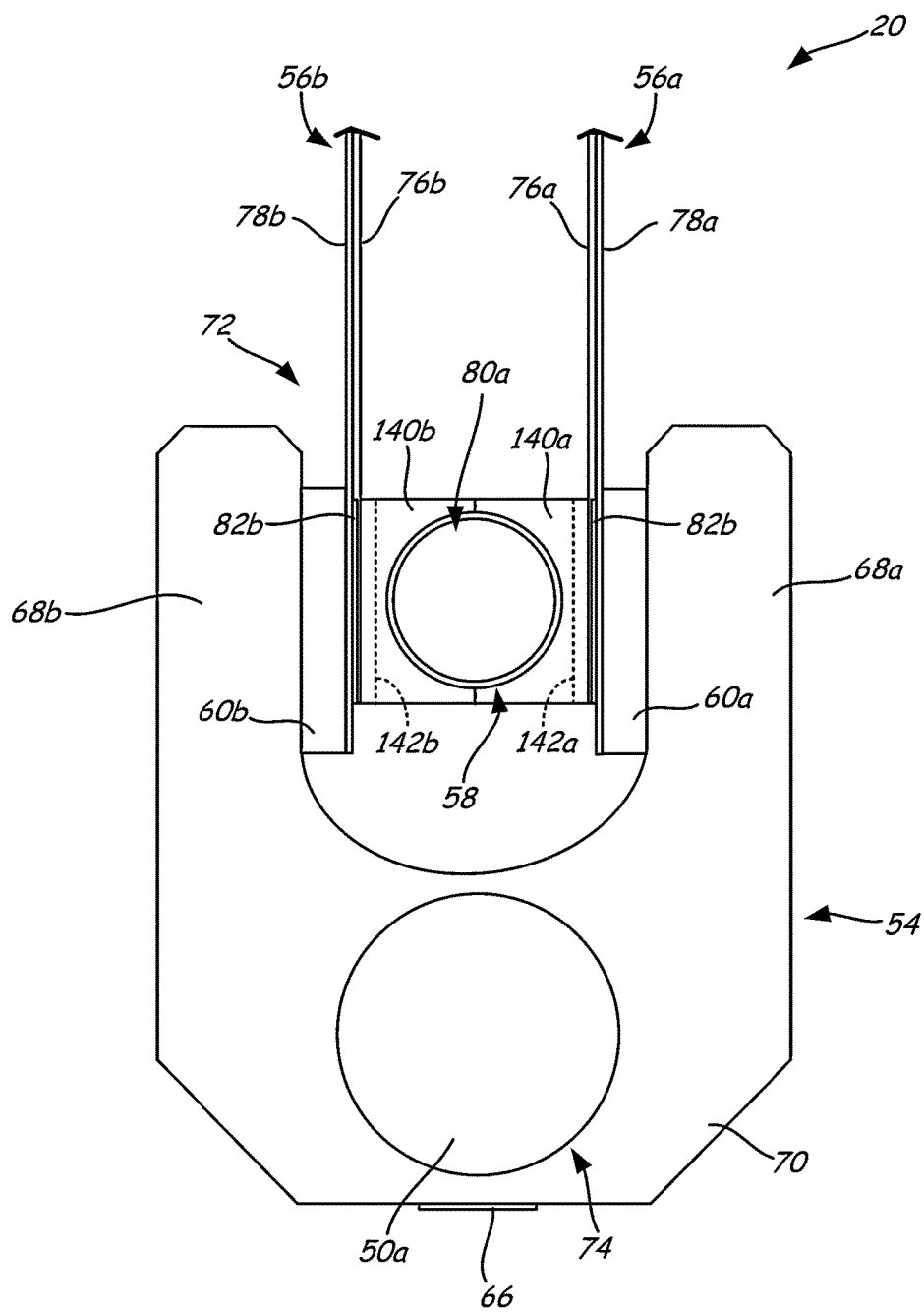
FIG. 11 is a top view of an alternative liquefier assembly of the present disclosure, which includes a cylindrical liquefier tube.

As mentioned above, in alternative embodiments, liquefier assembly 20 may be configured for use with liquefiers and filaments having other cross-sectional geometries. For instance, as shown in FIG. 11, in one preferred embodiment, liquefier assembly 20 may include cylindrical liquefier tube 58 for use with a cylindrical filament 52. In this embodiment, because liquefier tube 58 has a cylindrical geometry, liquefier assembly 20 may also include conductive spacers 140a and 140b having curved inner surfaces configured to mate with liquefier tube 58, and planar outer surfaces to mate with the planar heater assemblies 56a and 56b.

The cylindrical liquefier tube 58 is preferably a thin walled tube, having a wall thickness ranging from about 0.01 inches to about 0.03 inches, and more preferably from about 0.015 to about 0.020. Preferred inner diameters for liquefier tube 80 range from about 0.08 inches to about 0.10 inches, more preferably from about 0.090 inches to about 0.095 inches. Additional examples of suitable dimensions for cylindrical liquefier tube 58 include those disclosed in Swanson et al., U.S. Pat. No. 6,004,124; Swanson et al., U.S. Publication No. 2012/0018924; and Leavitt, U.S. patent application Ser. No. 13/708,037.

Conductive spacers 140a and 140b are each preferably fabricated from one or more thermally-conductive materials (e.g., aluminum) to transfer heat from heater assemblies 56a and 56b to liquefier tube 58. Furthermore, conductive spacers 140a and 140b may include indentations 142a and 142b, which reduce thermal spreading along the longitudinal lengths of conductive spacers 140a and 140b (i.e., along longitudinal axis 73) to further thermally isolate heating zones 88 from each other.

In some embodiments, sensors 66 may detect the strain on base portion 70 of clam block 54 in the same manner as discussed above. However, in comparison to the ribbon liquefier 58 shown above in FIGS. 2-9, the cylindrical geometry of liquefier 58 shown in FIG. 11 is typically a stiffer structure, which reduces the ballooning expansion that is otherwise present with the ribbon liquefier 58. As such, in this embodiment, sensors 66 are typically required to capable of detecting strain with higher levels of precision than is otherwise required for the ribbon liquefier 58.

Alternatively, and more preferably, the pressure within the cylindrical liquefier tube 58 is operably measured using a different technique. For example, in embodiments in which filament 52 includes surface tracks for engaging with drive mechanism 48, such as disclosed in Batchelder et al., U.S. Pat. No. 8,236,227, the tractor-engagement between drive mechanism 48 and filament 52 may be used to toggle print head 18 between a raised and lowered state. In this case, liquefier assembly 20 may also include one or more force gauge sensors 66 located at outlet end 80b of liquefier tube (e.g., at tip shield 62 or nozzle 64), which are configured to measure how much force filament 52 is applying to liquefier assembly 20 (minus how hard the extrudate is pressing against the 3D part below).

In addition to the feedback control during printing operations, the closed-loop thermal and/or pressure detections may also be used to calibrate liquefier assembly 20 between (or during) printing operations. For instance, the temperatures of each heating zone 88 may be monitored and/or sensors 66 may monitor the pressures within liquefier tube 58 while print head 18 extrudes the filament material into a purge bucket, such as disclosed in Turley et al., U.S. Pat. No. 7,744,364. This allows liquefier assembly 20 to be calibrated to account for manufacturing tolerances, and for subsequent gradual changes over time, such as liquefier scaling, material accumulation, and the like.

Figure 12:
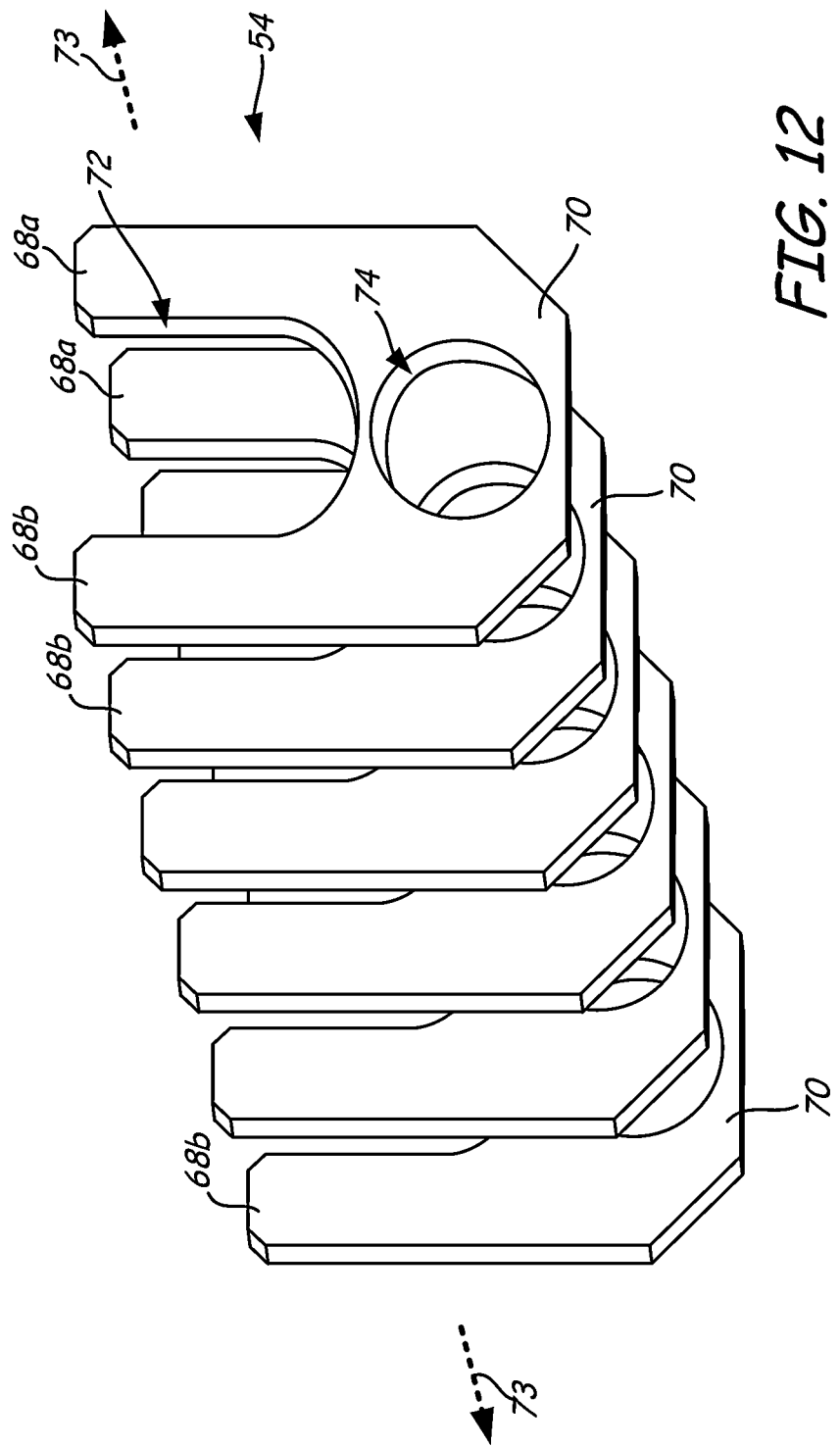
FIG. 12 is a top perspective view of an alternative rigid member from a clam block, which includes multiple, separate c-clip rigid members.

FIG. 12 illustrates an alternative to clam block 54. In this embodiment, clam block 54 may be replaced with multiple, separate c-clips rigid members 54, each having the same cross-sectional profile as clam block 54 (i.e., each c-clip rigid member may include a base portion 70 and a pair of arms 68a and 68b) to define gap 72. These c-clips rigid members 54 may function in the same manner as clam block 54, but may further assist in thermally isolating each heating zone 88, as well as increasing the thermal draw from liquefier tube 58 (due to the increased exposed surface area). In fact, in some embodiments where the c-clips rigid members 54 exhibit sufficient thermal draw to function as a stand-alone heat sink, heat sink unit 50 (and optionally shaft 74) may be omitted.

Furthermore, one or more of the c-clips rigid members 54 may retain a sensor 66, if desired. In some embodiments, the base portions 70 of the c-clips rigid members 54 may also be connected with a spine member extending along longitudinal axis 73. This arrangement allows the c-clips rigid members 54 to maintain their serial relationship along longitudinal axis 73, and more readily accommodates the use of replaceable liquefier tubes 58.

As can be seen from the above-discussion, liquefier assembly 20 is uniquely engineered to improve thermal control over the melting and extrusion of consumable materials (e.g., filament 52). This is achieved with the push-pull thermal driver effect from heater assemblies 56a and 56b, along with resistors blocks 60a and 60b, the thermally-conductive clam block 54, and heat sink unit 50. With this design, liquefier assembly 20 can generate controllable and precise heat flows, which provide fast response times and high flow rates during printing operations.

Additionally, controller assembly 38 may dynamically control the heat flow transferred to and from liquefier tube 58 over multiple heating zones 88, such as generating thermal waves along liquefier tube 58, which can increase flow rates during printing operations, while also reducing the risk of thermally degrading the consumable material. Furthermore, the pressure within liquefier tube 58 may be operably measured, allowing controller assembly 38 to adjust the feeding of filament 52 to liquefier tube 38 in response to the measured pressure to control the material flow rate of the extrudate in a closed-loop manner. This is particularly suitable for compensating for the unpredictability in flow decelerations, such as for slow decay portions having response times greater than about 100 milliseconds, which can response times during printing operations.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
    feeding a consumable material to a liquefier tube retained by the additive manufacturing system at a first feed rate;
    heating the liquefier tube over multiple heating zones to heat the consumable material received in the liquefier tube to a target temperature such that the consumable material melts while preventing thermal degradation;
    feeding the consumable material to the liquefier tube at a second feed rate that is greater than the first feed rate;
    adjusting the heating of the liquefier tube over the multiple heating zones based at least in part of an increase of the feed rate of the consumable material to the second feed rate to the liquefier tube wherein an upper zone imparts heat to the consumable material at a temperature above a target temperature of the consumable material and a lower zone imparts heat at a lower temperature to a temperature below the target temperature such that the consumable material does not thermally degrade; and
    extruding the molten consumable material from a nozzle retained by the liquefier tube at the increased feed rate with substantially no thermal degradation of the liquefied consumable material.

2. The method of claim 1, wherein heating the liquefier tube over the multiple heating zones comprises relaying electrical power over conductor traces of a plate heater assembly to heating elements of the plate heater assembly.

3. The method of claim 2, wherein adjusting the heating of the liquefier tube comprises adjusting the amount of electrical power relayed over at least a portion of the conductor traces to the heating elements.

4. The method of claim 1, and further comprising:
    measuring a temperature at a location along the liquefier tube; and
    regulating a temperature in each of the multiple heating zones in a closed-loop manner based on the measured temperature.

5. The method of claim 1, wherein adjusting the heating of the liquefier tube over the multiple heating zones comprises generating multiple thermal waves across a cross-section of the consumable material in the liquefier tube where at least one thermal wave from the upper zone is at a temperature above the target temperature.

6. The method of claim 1, wherein the consumable material comprises a ribbon filament, and wherein the liquefier tube comprises a ribbon liquefier tube.

7. A method for printing a three-dimensional part with an additive manufacturing system, the method comprising:
    providing a liquefier tube having an inlet end, an outlet end, and a length extending therebetween and a heater assembly in thermal contact with the liquefier tube and extending along the length of the liquefier tube;
    feeding a consumable material to the inlet end of the liquefier tube at a first feed rate;
    supplying a first selected amount of heat to a first portion of the liquefier tube with the heater assembly to provide a first, substantially uniform, temperature profile along the first portion of the liquefier tube while feeding the consumable material at the first feed rate such that the consumable material is heated to a target temperature where the consumable material melts but does not thermally degrade;
    adjusting the feeding of the consumable material to the liquefier tube from the first feed rate to a second feed rate that is greater than the first feed rate;
    supplying a second selected amount of heat to a second portion of the liquefier tube with the heater assembly for adjusting the temperature profile of the second portion of the liquefier tube to provide a second temperature profile along the liquefier tube while feeding the consumable material at the second feed rate, and wherein the second temperature profile includes comprises multiple heating zones wherein an upper zone imparts heat at a temperature above the target temperature of the consumable material and a zone below the upper zone imparts heat a temperature below the target temperature such that second temperature profile increases a rate at which the consumable material melts while substantially preventing thermal degradation of the consumable material within the liquefier tube; and
    extruding the consumable material from a nozzle retained by the outlet end of the liquefier tube.

8. The method of claim 7, wherein the heater assembly comprises multiple heating elements positioned along the length of the heater assembly for independently heating the liquefier tube along the multiple heating zones.

9. The method of claim 7, wherein adjusting the temperature profile of the liquefier tube having the multiple heating zones comprises:
    increasing the supply of heat to one or more upper zones of the multiple heating zones at a temperature at which the consumable material thermal degrades;
    decreasing temperatures of one or more zones below the one or more upper zones of the multiple heating zones that are downstream from the first zones by reducing or discontinuing the supply of heat to the second zones to prevent the consumable material from thermally degrading.

10. The method of claim 7, wherein the extruded consumable material is substantially free of thermal degradation from the heating in the liquefier tube.

11. The method of claim 7, and further comprising:
    measuring a temperature at a location along the liquefier tube;
    regulating a first temperature in a closed-loop manner based on the measured temperature to substantially maintain the first temperature profile along the first portion of the liquefier tube while feeding the consumable material at the first feed rate; and
    regulating a second temperature in the closed-loop manner based on the measured temperature to substantially maintain the second temperature profile along the second portion of the liquefier tube while feeding the consumable material at the second feed rate.

12. The method of claim 7, wherein the heater assembly comprises a plate heater having a plurality of heating elements and conductor traces and wherein supplying heat to the liquefier tube along the multiple heating zones comprises providing electrical power through the conductor traces the heating elements which are in thermal contact with the liquefier tube.

13. The method of claim 12, wherein adjusting the thermal profile of the liquefier tube comprises adjusting the amount of electrical power relayed over at least a portion of the conductor traces to the heating elements.

14. A method for printing a three-dimensional part with an additive manufacturing system, the method comprising:

feeding a filament to a liquefier tube retained by the additive manufacturing system;

independently supplying power to a plurality of heating elements in thermal contact with the liquefier tube;

heating the liquefier tube over multiple heating zones with the plurality of independently-heated heating elements to melt the filament received in the liquefier tube;

adjusting the power relayed to at least a portion of the plurality of heating elements to adjust the heating of the heating elements in association with increases in rates at which the filament is fed to the liquefier tube by adjusting at least one upper zone to provide heat at a temperature above a target temperature at which the filament melts but does not thermally degrade and by adjusting at least one zone below the upper zone to provide heat at a temperature below the target temperature; and extruding the molten material of the filament from a nozzle retained by the liquefier tube wherein the extruded molten material is substantially free of thermal degradation.

15. The method of claim 14, and further comprising:

measuring a first temperature at a point along the liquefier tube; and regulating a temperature in each of the multiple zones in a closed-loop manner based on the measured first temperature.

16. The method of claim 14, wherein the liquefier tube comprises a substantially-rectangular liquefier tube, and wherein feeding the filament comprises feeding a ribbon filament.

17. The method of claim 14, wherein the liquefier tube comprises a cylindrical liquefier tube, and wherein feeding the filament comprises feeding a cylindrical filament.

* * * * *

UNITED STATES PATENT AND TRADEMARK OFFICE
CERTIFICATE OF CORRECTION

PATENT NO. : 10,086,564 B2
APPLICATION NO. : 14/046315
DATED : October 2, 2018
INVENTOR(S) : J. Samuel Batchelder, William J. Swanson and Kevin C. Johnson Page 1 of 1

It is certified that error appears in the above-identified patent and that said Letters Patent is hereby corrected as shown below:

On the Title Page

Item (73) In the Assignee:
Please delete "Stratsys, Inc." and insert --Stratasys, Inc.--

In the Claims

Claim 7, Column 26, Line 15-16:
Please delete "includes comprises multiple heating zones" and insert --comprises multiple heating zones--

Signed and Sealed this
Fifth Day of March, 2019

Andrei Iancu
*Director of the United States Patent and Trademark Office*